United States Patent
Yu et al.

(10) Patent No.: US 11,044,639 B2
(45) Date of Patent: Jun. 22, 2021

(54) TECHNIQUES FOR TRANSMISSION CONTROL PROTOCOL AWARE HANDOVER TYPE DETERMINATION

(71) Applicant: QUALCOMM Incorporated, San Diego, CA (US)

(72) Inventors: Yu-Ting Yu, Somerset, NJ (US); Vincent Douglas Park, Budd Lake, NJ (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 15/243,360

(22) Filed: Aug. 22, 2016

(65) Prior Publication Data

US 2017/0311208 A1 Oct. 26, 2017

Related U.S. Application Data

(60) Provisional application No. 62/325,777, filed on Apr. 21, 2016.

(51) Int. Cl.
*H04W 36/00* (2009.01)

(52) U.S. Cl.
CPC ... *H04W 36/0016* (2013.01); *H04W 36/0055* (2013.01); *H04W 36/0058* (2018.08); *H04W 36/0069* (2018.08)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS 6,968,190 B1 * 11/2005 Suumaki ........... H04W 36/0066
370/331
7,668,138 B2 * 2/2010 Abedi .................... H04W 36/18
370/238

(Continued)

FOREIGN PATENT DOCUMENTS

CN 101006704 A 7/2007
CN 101053178 A 10/2007

(Continued)

OTHER PUBLICATIONS

ISA/EP, International Search Report and Written Opinion of the International Searching Authority, Int'l Application No.—PCT/US2017/027664, Aug. 25, 2017, European Patent Office, Rijswijk, NL, 18 pgs.

*Primary Examiner* — Peter G Solinsky
*Assistant Examiner* — Sanjay K Dewan
(74) *Attorney, Agent, or Firm* — Holland & Hart LLP/Qualcomm

(57) ABSTRACT

Methods, systems, and devices for wireless communication are described. A serving base station may determine a handover loss metric associated with a UE that is a candidate for handover. The handover loss metric may be based on connection parameters associated with the serving base station and a target base station, respectively. The serving base station may identify, based on the handover loss metric, a type of handover procedure to perform. The serving base station may perform the handover procedure of the UE to the target base station according to the identified handover type.

27 Claims, 24 Drawing Sheets

(56) References Cited

U.S. PATENT DOCUMENTS

| | | | |
|---|---|---|---|
| 7,792,130 B2* | 9/2010 | Fischer | G08C 17/02 370/310 |
| 8,467,349 B2* | 6/2013 | Agashe | H04L 1/1887 370/310 |
| 8,818,375 B2* | 8/2014 | Meyer | H04W 36/02 370/331 |
| 8,964,690 B2* | 2/2015 | Bellamkonda | H04W 36/0077 370/331 |
| 9,565,614 B2* | 2/2017 | Hong | H04W 36/32 |
| 9,681,344 B1* | 6/2017 | Oroskar | H04W 36/023 |
| 10,015,708 B1* | 7/2018 | Rai | H04W 36/023 |
| 10,313,947 B1* | 6/2019 | Sung | H04W 36/22 |
| 2006/0007862 A1* | 1/2006 | Sayeedi | H04L 47/10 370/235 |
| 2006/0056350 A1* | 3/2006 | Love | H04W 72/0406 370/331 |
| 2006/0092960 A1* | 5/2006 | Lee | H04L 1/1845 370/412 |
| 2006/0098597 A1* | 5/2006 | Kurzmann | H04W 36/02 370/331 |
| 2006/0268781 A1* | 11/2006 | Svensson | H04W 36/0022 370/331 |
| 2007/0014259 A1* | 1/2007 | Fajardo | H04W 36/02 370/331 |
| 2007/0047489 A1* | 3/2007 | Bachl | H04L 29/06027 370/331 |
| 2007/0091848 A1* | 4/2007 | Karia | H04L 61/2578 370/331 |
| 2008/0095112 A1* | 4/2008 | Wiemann | H04W 36/02 370/331 |
| 2008/0310368 A1* | 12/2008 | Fischer | H04L 47/10 370/331 |
| 2009/0003280 A1* | 1/2009 | Kasapidis | H04W 88/02 370/331 |
| 2009/0207808 A1* | 8/2009 | McCann | H04W 36/0038 370/331 |
| 2010/0046466 A1* | 2/2010 | Morimoto | H04W 36/34 370/331 |
| 2010/0232394 A1* | 9/2010 | Ohta | H04W 36/026 370/331 |
| 2010/0265915 A1* | 10/2010 | Sun | H04W 36/0033 370/331 |
| 2010/0329135 A1* | 12/2010 | Pelletier | H04W 72/1284 370/252 |
| 2011/0164589 A1* | 7/2011 | Lee | H04W 36/02 370/331 |
| 2012/0287909 A1* | 11/2012 | Ohta | H04W 36/023 370/331 |
| 2013/0003703 A1* | 1/2013 | Todd | H04W 36/18 370/331 |
| 2013/0215772 A1* | 8/2013 | Kaur | H04W 36/0072 370/252 |
| 2013/0223409 A1* | 8/2013 | Jung | H04W 36/0072 370/331 |
| 2014/0056243 A1 | 2/2014 | Pelletier et al. | |
| 2014/0211756 A1* | 7/2014 | Bontu | H04W 36/04 370/331 |
| 2015/0110069 A1* | 4/2015 | Keller | H04W 36/0022 370/331 |
| 2015/0296418 A1* | 10/2015 | Szilagyi | H04W 36/0016 370/331 |
| 2015/0358869 A1* | 12/2015 | Byun | H04W 36/08 370/331 |
| 2016/0021581 A1* | 1/2016 | Deenoo | H04W 36/0055 370/331 |
| 2016/0164793 A1* | 6/2016 | Basu Mallick | H04W 28/06 370/235 |
| 2016/0374129 A1* | 12/2016 | Saiwai | H04W 48/06 |
| 2018/0255488 A1* | 9/2018 | Kim | H04W 36/0055 |
| 2018/0287748 A1* | 10/2018 | Kim | H04L 49/9015 |

FOREIGN PATENT DOCUMENTS

| | | | |
|---|---|---|---|
| CN | 101951651 A | 1/2011 | |
| CN | 102076040 A | 5/2011 | |
| WO | WO 2013/025562 A2 * | 8/2012 | H04W 52/40 |
| WO | WO 2013/025562 A2 * | 2/2013 | H04W 52/40 |
| WO | WO-2013025562 A2 | 2/2013 | |
| WO | WO-2015002232 A1 | 1/2015 | |
| WO | WO 2015/197431 A1 * | 6/2015 | H04W 52/02 |
| WO | WO 2015/197431 A1 * | 12/2015 | H04W 52/02 |
| WO | WO-2015197431 A1 | 12/2015 | |

* cited by examiner

TECHNIQUES FOR TRANSMISSION CONTROL PROTOCOL AWARE HANDOVER TYPE DETERMINATION

CROSS REFERENCES

The present application for patent claims priority to U.S. Provisional Patent Application No. 62/325,777 by Yu et al., entitled "Transmission Control Protocol Aware Handover Type Determination," filed Apr. 21, 2016, assigned to the assignee hereof.

INTRODUCTION

The following relates generally to wireless communication, and more specifically to transmission control protocol (TCP) aware handover type determination.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Wireless communications systems may be heterogeneous and may support different technologies, different capabilities, etc. For example, certain base stations may be associated with a long term evolution (LTE) based evolved packet core (EPC) whereas other base stations may be associated with advanced wireless communications systems, e.g., 5G, millimeter wave (mmW), etc. In some examples, the different technologies may support communication speeds that differ by an order of magnitude, e.g., x10, x100, etc. As UEs travel within coverage areas of different base stations, and within different technologies in some examples, handover procedures may prove difficult. For example, while a handover procedure may be accomplished at the physical layer with the appropriate transfer of radio resources, higher layer functions may be impacted when a UE is handed over from an LTE base station to an advanced base station, e.g., a 5G base station, a mmW base station, etc.

SUMMARY

A method of wireless communication is described. The method may include determining a capability of the UE to maintain buffered data during a handover procedure, transmitting an indication of the capability of the UE to maintain buffered data during the handover procedure based at least in part on the determination, and performing a handover procedure based at least in part on transmitting the indication.

An apparatus for wireless communication is described. The apparatus may include means for determining a capability of the UE to maintain buffered data during a handover procedure, means for transmitting an indication of the capability of the UE to maintain buffered data during the handover procedure based at least in part on the determination, and means for performing a handover procedure based at least in part on transmitting the indication.

Another apparatus for wireless communication is described. The apparatus may include a processor and memory in electronic communication with the processor. The processor and memory may be configured to determine a capability of the UE to maintain buffered data during a handover procedure, transmit an indication of the capability of the UE to maintain buffered data during the handover procedure based at least in part on the determination, and perform a handover procedure based at least in part on transmitting the indication.

A non-transitory computer readable medium for wireless communication is described. The non-transitory computer-readable medium may include instructions operable to cause a processor to determine a capability of the UE to maintain buffered data during a handover procedure, transmit an indication of the capability of the UE to maintain buffered data during the handover procedure based at least in part on the determination, and perform a handover procedure based at least in part on transmitting the indication.

Some examples of the method, apparatus, and non-transitory computer-readable medium described above may further include processes, features, means, or instructions for receiving an indication to maintain or discard buffered data based at least in part on transmitting the indication of the capability of the UE to maintain buffered data during the handover procedure.

In some examples of the method, apparatus, and non-transitory computer-readable medium described above, the received indication comprises a first indication to maintain or discard buffered data for uplink and a second indication to maintain or discard buffered data for downlink. In some examples of the method, apparatus, and non-transitory computer-readable medium described above, the received indication indicates whether to maintain or discard buffered data for individual bearers. In some examples, the transmitted indication comprises a buffer size limit of the UE or a buffer size limit of a radio bearer associated with the UE. In some examples of the method, apparatus, and non-transitory computer-readable medium described above, the transmitted indication comprises a first indication of a capability of the UE to maintain buffered data for uplink and a second indication of a capability of the UE to maintain buffered data for downlink.

Some examples of the method, apparatus, and non-transitory computer-readable medium described above may further include processes, features, means, or instructions for establishing a connection to a network via a base station serving the UE, wherein the indication may be transmitted based at least in part on establishment of the connection. Some examples of the method, apparatus, and non-transitory computer-readable medium described above may further include processes, features, means, or instructions for receiving a message from a base station serving the UE, wherein transmitting the indication may be in response to receiving the message.

Some examples of the method, apparatus, and non-transitory computer-readable medium described above may further include processes, features, means, or instructions for performing the handover procedure comprises discarding data buffered at the UE prior to establishing a connection with a target base station. Some examples of the method, apparatus, and non-transitory computer-readable medium described above may further include processes, features, means, or instructions for performing the handover procedure comprises transmitting buffered data to a target base station.

In some examples of the method, apparatus, and non-transitory computer-readable medium described above, the buffered data comprises data buffered in a packet data convergence protocol (PDCP) buffer. In some examples of the method, apparatus, and non-transitory computer-readable medium described above, the buffered data comprises data sent over the air that may have not yet been received or acknowledged by an intended recipient. In some examples of the method, apparatus, and non-transitory computer-readable medium described above, the buffered data comprises all data ready to send over a connection.

A method of wireless communication is described. The method may include receiving, from a serving base station, an indication whether to maintain buffered data during a handover procedure, determining whether to maintain or discard data buffered at the UE based at least in part on the received indication, and performing the handover procedure according to the received indication.

An apparatus for wireless communication is described. The apparatus may include means for receiving, from a serving base station, an indication whether to maintain buffered data during a handover procedure, means for determining whether to maintain or discard data buffered at the UE based at least in part on the received indication, and means for performing the handover procedure according to the received indication.

Another apparatus for wireless communication is described. The apparatus may include a processor and memory in electronic communication with the processor. The processor and memory may be configured to receive, from a serving base station, an indication whether to maintain buffered data during a handover procedure, determine whether to maintain or discard data buffered at the UE based at least in part on the received indication, and perform the handover procedure according to the received indication.

A non-transitory computer readable medium for wireless communication is described. The non-transitory computer-readable medium may include instructions operable to cause a processor to receive, from a serving base station, an indication whether to maintain buffered data during a handover procedure, determine whether to maintain or discard data buffered at the UE based at least in part on the received indication, and perform the handover procedure according to the received indication.

In some examples of the method, apparatus, and non-transitory computer-readable medium described above, the indication comprises a first indication of whether to maintain data buffered for downlink and a second indication of whether to maintain data buffered for uplink. In some examples of the method, apparatus, and non-transitory computer-readable medium described above, determining whether to maintain or discard data buffered at the UE comprises: discarding data buffered at a PDCP buffer when the indication comprises an indication to discard data buffered for uplink.

In some examples of the method, apparatus, and non-transitory computer-readable medium described above, determining whether to discard data buffered at the UE comprises delivering one or more packets of the data buffered at the UE to an upper layer or to a next hop for uplink when the indication comprises an indication to discard data buffered for uplink. In some examples of the method, apparatus, and non-transitory computer-readable medium described above, determining whether to maintain or discard data buffered at the UE comprises: forwarding one or more packets from a PDCP buffer to an application layer of the UE.

In some examples of the method, apparatus, and non-transitory computer-readable medium described above, determining whether to discard data buffered at the UE comprises transmitting one or more packets of the data buffered at the UE to a target base station.

A method of wireless communication is described. The method may include determining, by a first base station, that a connection is established between a UE and a network, receiving a connection parameter associated with a second base station associated with the network, determining whether buffered data addressed to the UE is to be maintained or discarded during a handover procedure based at least in part on a connection parameter associated with the first base station and the connection parameter associated with the second base station, and performing the handover procedure with the UE and the second base station according to the determination.

An apparatus for wireless communication is described. The apparatus may include means for determining, by a first base station, that a connection is established between a UE and a network, means for receiving a connection parameter associated with a second base station associated with the network, means for determining whether buffered data addressed to the UE is to be maintained or discarded during a handover procedure based at least in part on a connection parameter associated with the first base station and the connection parameter associated with the second base station, and means for performing the handover procedure with the UE and the second base station according to the determination.

Another apparatus for wireless communication is described. The apparatus may include a processor and memory in electronic communication with the processor. The processor and memory may be configured to determine, by a first base station, that a connection is established between a UE and a network, receive a connection parameter associated with a second base station associated with the network, determine whether buffered data addressed to the UE is to be maintained or discarded during a handover procedure based at least in part on a connection parameter associated with the first base station and the connection parameter associated with the second base station, and perform the handover procedure with the UE and the second base station according to the determination.

A non-transitory computer readable medium for wireless communication is described. The non-transitory computer-readable medium may include instructions operable to cause a processor to determine, by a first base station, that a connection is established between a UE and a network, receive a connection parameter associated with a second base station associated with the network, determine whether buffered data addressed to the UE is to be maintained or discarded during a handover procedure based at least in part on a connection parameter associated with the first base station and the connection parameter associated with the second base station, and perform the handover procedure with the UE and the second base station according to the determination.

Some examples of the method, apparatus, and non-transitory computer-readable medium described above may further include processes, features, means, or instructions for forwarding one or more packets of the buffered data to the second base station when the buffered data may be determined to be maintained. Some examples of the method, apparatus, and non-transitory computer-readable medium described above may further include processes, features, means, or instructions for discarding one or more downlink packets of the buffered data when the buffered data may be determined to be discarded. Some examples of the method, apparatus, and non-transitory computer-readable medium described above may further include processes, features, means, or instructions for delivering one or more packets of buffered data received from the UE to an upper layer or to a next hop for when the buffered data may be determined to be discarded.

In some examples of the method, apparatus, and non-transitory computer-readable medium described above, the connection parameter associated with the second base station may be conveyed in a non-UE-specific message received over an X2 interface between the first base station and the second base station. Some examples of the method, apparatus, and non-transitory computer-readable medium described above may further include processes, features, means, or instructions for transmitting an indication of whether the buffered data may be to be maintained or discarded to the second base station.

In some examples of the method, apparatus, and non-transitory computer-readable medium described above, the indication may be transmitted in a handover request or a handover acknowledgement. Some examples of the method, apparatus, and non-transitory computer-readable medium described above may further include processes, features, means, or instructions for computing a throughput metric using the connection parameter associated with the first base station, or the connection parameter associated with the second base station, or a combination thereof, wherein determining whether to maintain or discard buffered data may be based at least in part on the throughput metric.

Some examples of the method, apparatus, and non-transitory computer-readable medium described above may further include processes, features, means, or instructions for transmitting an indication of the throughput metric to the second base station. Some examples of the method, apparatus, and non-transitory computer-readable medium described above may further include processes, features, means, or instructions for monitoring the connection, wherein the connection parameter associated with the first base station may be determined based at least in part on the monitoring. Some examples of the method, apparatus, and non-transitory computer-readable medium described above may further include processes, features, means, or instructions for receiving the connection parameter associated with the first base station from the UE.

In some examples of the method, apparatus, and non-transitory computer-readable medium described above, the connection parameter associated with the first base station comprises at least one of an effective data rate associated with a TCP session established via the first base station, or a TCP version of a TCP session established via the first base station, or a size of TCP packets communicated over a TCP session established via the first base station, or a combination thereof.

In some examples of the method, apparatus, and non-transitory computer-readable medium described above, the connection parameter associated with the first base station comprises at least one of an effective data rate associated with a TCP session established via the first base station, or a TCP version of a TCP session established via the first base station, or a round trip time for an air interface between the UE and the first base station, or a round trip time for an air interface between the first base station and a TCP client device, or an estimated effective throughput metric associated with a TCP session established via the second base station, or a packet size of TCP data communicated over a TCP session established via the first base station, or a combination thereof.

Some examples of the method, apparatus, and non-transitory computer-readable medium described above may further include processes, features, means, or instructions for determining whether to maintain or discard buffered data may be based at least in part on a policy at the first base station, wherein the policy comprises the connection parameter associated with the first base station and the connection parameter associated with the second base station. In some examples of the method, apparatus, and non-transitory computer-readable medium described above, the policy comprises combinations of communication link types.

In some examples of the method, apparatus, and non-transitory computer-readable medium described above, the policy comprises at least one of a type of communication link associated with the first base station, or a type of communication link associated with the second base station, or a loading of the first base station, or a loading of the second base station, or a TCP version of a TCP session established via the first base station, or a packet size of TCP data communicated over a TCP session established via the first base station, or a throughput of a TCP session established via the first base station, or a throughput of a communication link associated with the second base station and the UE, or an estimated round trip time of a communication link associated with the UE and the second based station, or a combination thereof.

In some examples of the method, apparatus, and non-transitory computer-readable medium described above, the connection parameter associated with the second base station comprises at least one of estimated effective data rate associated with a TCP session established via the second base station, or an estimated round trip time for an air interface between the UE and the second base station, or an estimated round trip time for an air interface between the second base station and a TCP client device, or an estimated effective throughput metric associated with a TCP session established via the second base station, or a combination thereof.

A method of wireless communication is described. The method may include monitoring, by a serving base station, a throughput metric associated with a first connection between a UE and the serving base station, identifying an expected throughput metric associated with a second connection between the UE and a target base station, identifying, based at least in part on the throughput metric and the expected throughput metric, a handover loss metric associated with a handover procedure of the UE from the serving base station to the target base station and performing the handover procedure of the UE to the target base station according to the identified handover loss metric.

An apparatus for wireless communication is described. The apparatus may include means for monitoring, by a serving base station, a throughput metric associated with a first connection between a UE and the serving base station, means for identifying an expected throughput metric associated with a second connection between the UE and a target base station, means for identifying, based at least in part on the throughput metric and the expected throughput metric, a handover loss metric associated with a handover procedure of the UE from the serving base station to the target base station and means for performing the handover procedure of the UE to the target base station according to the identified handover loss metric.

A further apparatus is described. The apparatus may include a processor and memory in electronic communication with the processor. The processor and memory may be configured to monitor, by a serving base station, a throughput metric associated with a first connection between a UE and the serving base station, identify an expected throughput metric associated with a second connection between the UE and a target base station, identify, based at least in part on the throughput metric and the expected throughput metric, a handover loss metric associated with a handover procedure of the UE from the serving base station to the target base station and perform the handover procedure of the UE to the target base station according to the identified handover loss metric.

A non-transitory computer readable medium for wireless communication is described. The non-transitory computer-readable medium may include instructions to cause a processor to monitor, by a serving base station, a throughput metric associated with a first connection between a UE and the serving base station, identify an expected throughput metric associated with a second connection between the UE and a target base station, identify, based on the throughput metric and the expected throughput metric, a handover loss metric associated with a handover procedure of the UE from the serving base station to the target base station and perform the handover procedure of the UE to the target base station according to the identified handover loss metric.

Some examples of the method, apparatus, or non-transitory computer-readable medium described above may further include processes, features, means, or instructions for determining that the handover loss metric comprises a lossy handover metric. Some examples of the method, apparatus, or non-transitory computer-readable medium described above may further include processes, features, means, or instructions for refraining from forwarding one or more buffered packets to the target base station, the buffered packets being addressed to the UE.

Some examples of the method, apparatus, or non-transitory computer-readable medium described above may further include processes, features, means, or instructions for determining that the handover loss metric comprises a lossless handover metric. Some examples of the method, apparatus, or non-transitory computer-readable medium described above may further include processes, features, means, or instructions for forwarding one or more buffered packets to the target base station, the buffered packets being addressed to the UE.

Some examples of the method, apparatus, or non-transitory computer-readable medium described above may further include processes, features, means, or instructions for receiving, from the target base station, a connection parameter associated with the second connection between the target base station and the UE. Some examples of the method, apparatus, or non-transitory computer-readable medium described above may further include processes, features, means, or instructions for estimating an effective throughput rate associated with a TCP session established via the target base station. Some examples of the method, apparatus, or non-transitory computer-readable medium described above may further include processes, features, means, or instructions for identifying the expected throughput metric based on the estimated effective throughput rate.

Some examples of the method, apparatus, or non-transitory computer-readable medium described above may further include processes, features, means, or instructions for transmitting, to the target base station, an indication of the handover loss metric.

In some examples of the method, apparatus, or non-transitory computer-readable medium described above, the throughput metric comprises at least one of an effective throughput rate associated with a TCP session established via the serving base station, or a round trip time for an air interface between the UE and the serving base station, or a link data rate between the UE and the serving base station, or combinations thereof. In some examples of the method, apparatus, or non-transitory computer-readable medium described above, the expected throughput metric comprises one or more of an estimated effective throughput rate associated with a TCP session established via the target base station, or an estimated round trip time for an air interface between the UE and the target base station, or an estimated link data rate between the UE and the target base station, or combinations thereof.

A method of wireless communication is described. The method may include receiving, at a target base station, a handover request message from a serving base station, transmitting a connection parameter to the serving base station, the connection parameter associated with a connection between the target base station and a UE, the connection parameter comprising information associated with an effective throughput rate associated with a TCP session established via the target base station, receiving a handover procedure message from the serving base station, the handover procedure message comprising an indication of a handover loss metric, the handover loss metric based at least in part on the connection parameter and performing a handover procedure of the UE to the target base station according to the handover loss metric.

An apparatus for wireless communication is described. The apparatus may include means for receiving, at a target base station, a handover request message from a serving base station, means for transmitting a connection parameter to the serving base station, the connection parameter associated with a connection between the target base station and a UE, the connection parameter comprising information associated with an effective throughput rate associated with a TCP session established via the target base station, means for receiving a handover procedure message from the serving base station, the handover procedure message comprising an indication of a handover loss metric, the handover loss metric based at least in part on the connection parameter and means for performing a handover procedure of the UE to the target base station according to the handover loss metric.

A further apparatus is described. The apparatus may include a processor and memory in electronic communication with the processor. The processor and memory may be configured to receive, at a target base station, a handover request message from a serving base station, transmit a connection parameter to the serving base station, the connection parameter associated with a connection between the target base station and a UE, the connection parameter comprising information associated with an effective throughput rate associated with a TCP session established via the target base station, receive a handover procedure message from the serving base station, the handover procedure message comprising an indication of a handover loss metric, the handover loss metric based at least in part on the connection parameter and perform a handover procedure of the UE to the target base station according to the handover loss metric.

A non-transitory computer readable medium for wireless communication is described. The non-transitory computer-readable medium may include instructions to cause a processor to receive, at a target base station, a handover request message from a serving base station, transmit a connection parameter to the serving base station, the connection parameter associated with a connection between the target base station and a UE, the connection parameter comprising information associated with an effective throughput rate associated with a TCP session established via the target base station, receive a handover procedure message from the serving base station, the handover procedure message comprising an indication of a handover loss metric, the handover loss metric based on the connection parameter and perform a handover procedure of the UE to the target base station according to the handover loss metric.

In some examples of the method, apparatus, or non-transitory computer-readable medium described above, the handover loss metric comprises a lossy handover metric, the method further comprising: refraining from receiving one or more buffered packets from the serving base station, the buffered packets being addressed to the UE. In some examples of the method, apparatus, or non-transitory computer-readable medium described above, the handover loss metric comprises a lossless handover metric, the method further comprising receiving one or more buffered packets from the serving base station, the buffered packets being addressed to the UE. In some examples of the method, apparatus, or non-transitory computer-readable medium described above, the serving base station may identify a throughput ratio threshold K, wherein the throughput ratio threshold K is based at least in part on a TCP version

DETAILED DESCRIPTION

Figure 1:
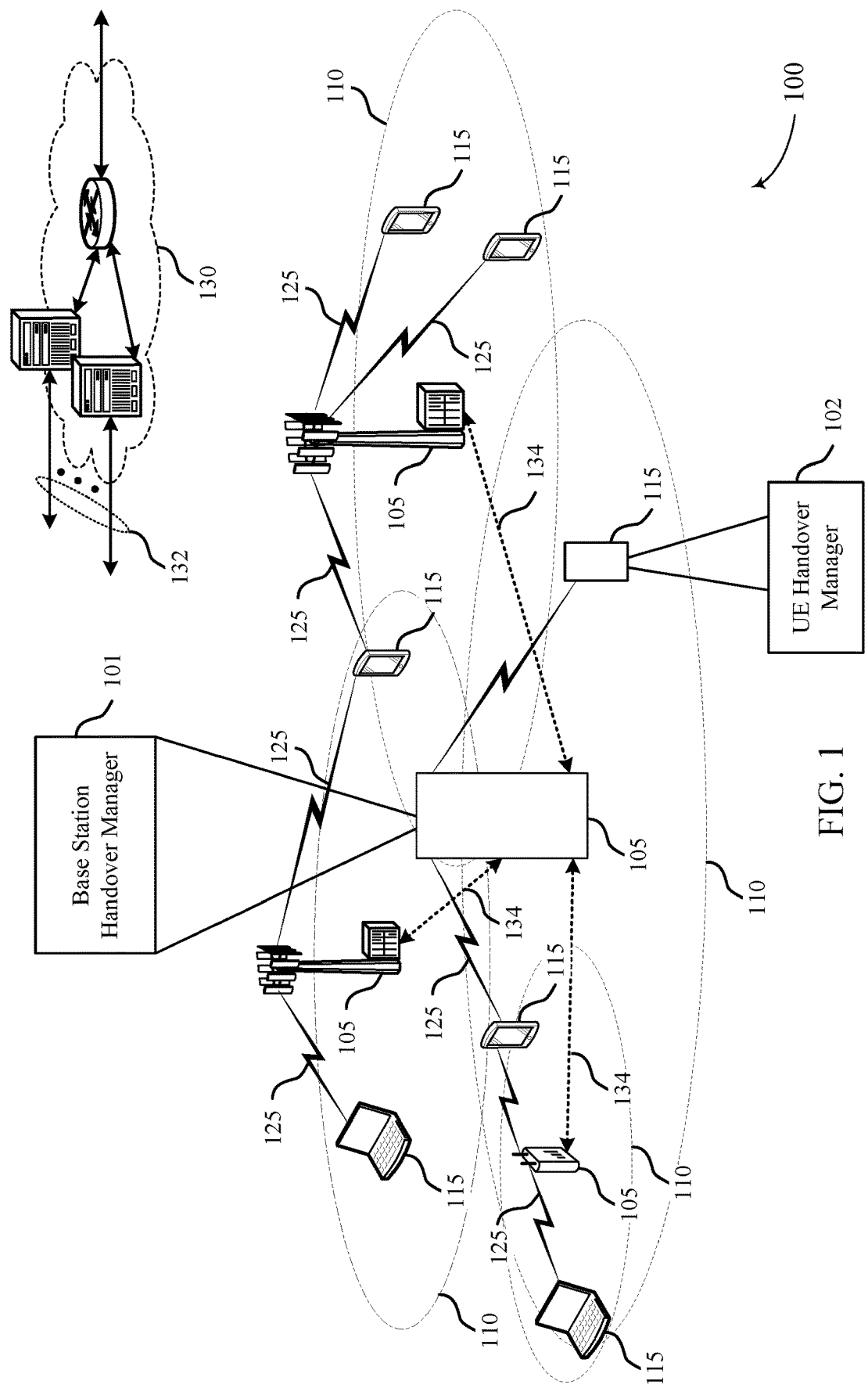
FIG. 1 illustrates an example of a wireless communications system that supports transmission control protocol aware handover type determination in accordance with aspects of the present disclosure.

Wireless communications systems may be packet-based systems that support transmission control protocol/internet protocol (TCP/IP). TCP is a widely used transport protocol and may support an assumption of a reliable connection between the TCP sender and receiver. TCP supports use of a congestion window to control the amount of in-flight data, e.g., the amount of data being transmitted at any particular time between the sender and receiver, or vice versa. The TCP congestion control assumes a data packet loss is an indicator of a congestion event and reduces the congestion window when such an event is detected. In a wireless communication system where devices are mobile, as a node moves from one point of attachment to another (e.g., from a serving base station to a target base station), the handover procedure traditionally forwards all buffered data in the serving base station to the new or target base station in order to prevent data loss-induced TCP throughput degradation. As wireless communication systems evolve to support higher data rates, the buffer space requirements during a handover may become a burden for implementation. In certain scenarios, e.g., handover from an extremely high data rate network to a low data rate network, the buffer requirements may exceed the capability of the low data rate network or further cause congestion at the low data network, which may affect the existing node's performance. Therefore, it may be beneficial to avoid lossless handover when the application performance is not affected.

Aspects of the disclosure are initially described in the context of a wireless communication system. For example, a base station (e.g., a serving base station or a target base station) may determine whether a handover will be a lossless handover or a lossy handover based on the characteristics and performance of the current network and the expected characteristics and performance of a target network. The serving base station may monitor or obtain connection parameters associated with the UE. The connection parameters may be based on an active TCP session of the UE, e.g., between the UE and a second device that the UE has an active TCP session with. During a handover event, the serving base station may receive information from a target base station that may be a candidate for a new serving base station for the UE. The information may be any information associated with the connection information for the target base station, e.g., which technology the target base station is associated with, what communication capabilities/data rates the target base station supports, etc. The serving base station may determine a metric for the expected throughput of the target base station and identify a handover loss metric based on the throughput metric of the serving base station and the expected throughput metric of the target base station. The serving base station may identify a type of handover procedure to use based on the handover loss metric. The serving base station may perform a handover procedure of the UE to the target base station according to the handover type. The handover loss metric may be indicative of whether the serving base station will forward all, some, or no buffered data packets addressed to the UE to the target base station.

Accordingly, the target base station may receive a handover request message from the serving base station of the UE. The target base station may respond by transmitting a connection parameter to the serving base station. The connection parameter may be based, at least in certain aspects, on a connection between the target base station and the UE. The connection parameter may be based on, or otherwise associated with, a TCP session established via the target base station. The target base station may receive a handover procedure message from the serving base station which may include an indication of the handover type or handover loss metric. The target base station may perform a handover procedure of the UE to the target base station according to the handover loss metric. Accordingly, the target base station may receive all, some, or no buffered data packets addressed to the UE from the serving base station.

In some cases, the serving base station will identify the handover type based on the handover capabilities of the UE. For example, the UE may transmit its handover capabilities to the serving base station. The handover capabilities may indicate whether or not the UE supports discarding buffered data packets during handover and/or limitations of the capabilities of the UE regarding transfer of buffered data at handover. In response to receiving the handover capabilities of the UE, the serving base station may select the handover type and send an indication of the handover type to the UE. Thus, UE may know which type of handover to perform. For example, the UE may decide whether to discard or maintain buffered packets during handover based on the handover type indication from the serving base station.

Aspects of the disclosure are further illustrated by and described with reference to apparatus diagrams, system diagrams, and flowcharts that relate to transmission control protocol aware handover type determination.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. In other examples, the wireless communications system 100 may be a heterogeneous network that includes an LTE/LTE-A network, an advanced wireless network, e.g., a 5G network, a mmW network, or combinations thereof.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 may be transferred from a serving base station 105 (known as the source base station) to another base station 105 (known as the target base station). For example, the UE 115 may be moving into the coverage area of the target base station 105, or the target base station 105 may be capable of providing better service for the UE 115 or relieving the serving base station 105 of excess load. The transition may be referred to as a "handover." Prior to a handover (HO), the serving base station 105 may configure the UE 115 with procedures for measuring the signal quality of neighboring base stations 105. The UE 115 may then respond with a measurement report. The serving base station 105 may use the measurement report to make the handover decision. In some cases, a handover may be lossy, which may refer to discarding one or more packets of buffered data during the handover procedure. If all of the buffered data is maintained, the handover procedure may be referred to as a lossless handover.

The decision to handover may be based on radio resource management (RRM) factors such as network load and interference mitigation. When the handover decision is made, the serving base station 105 may send a handover request message to the target base station 105, which may include context information to prepare the target base station 105 to serve the UE 115. The target base station 105 may make an admission control decision, for example, to ensure that it can meet the quality of service (QoS) standards of the UE 115. The target base station 105 may then configure resources for the incoming UE 115, and send a handover request acknowledge message to the serving base station 105, which may include radio resource control (RRC) information to be passed on to the UE 115. The handover request acknowledge message may, in some examples, include a connection parameter for a connection between the target base station 105 and the UE 115. The serving base station 105 may then direct the UE 115 to perform the handover, and pass a status transfer message to the target base station with PDCP bearer status information. The status transfer message may, in certain examples, include an indication of the handover loss metric determined by the serving base station 105. The UE 115 may attach to the target base station via a random access channel (RACH) procedure.

Wireless communications system 100 may operate in mmW frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communications systems, transmissions from the UE may be beamformed. Thus, uplink control channels may be received at a base station in a directional manner from multiple UEs.

In certain handover scenarios, the serving base station 105 and the target base station 105 may be associated with different networks. For example, the serving base station 105 may be associated with a mmW network and the target base station 105 may be associated with an LTE/LTE-A network. In other examples, the serving base station 105 may be associated with an LTE/LTE-A network and the target base station 105 may be associated with a mmW network. Throughput performance may vary substantially between different types of networks.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz., etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

According to aspects of the present disclosure, wireless communications system 100 may support techniques for a TCP aware handover type determination. For example, a UE 115 may include a UE handover manager 102. The UE handover manager 102 may be an example of the UE handover manager discussed with reference to FIGS. 4 through 7. The UE handover manager 102 may be configured for the presently described TCP aware handover type determination techniques, such as is described with reference to FIGS. 2 through 3D. The UE 115 may be in communication with a serving base station 105 and may be a candidate for handover to a target base station 105. The UE 115 may have an active TCP session established with a destination or client device (e.g., a remote UE 115, a remote server, etc.) via the serving base station 105. In some cases, the UE 115 may determine its handover capabilities. For instance, the UE 115 may determine its capability to support different types of handover procedures (e.g., the UE 115 may determine its capability to maintain or discard buffered data during a handover procedure). The UE 115 may determine its capability separately for uplink and downlink or for individual bearers. In some cases, the UE 115 may determine a size limit for one or more buffers at the UE 115 and/or a buffer size limit for one or more radio bearers associated with the UE 115. The buffer size limit(s) may be included in the handover capabilities of the UE 115. The UE 115 may send an indication of its handover capabilities to the serving base station 105. The serving base station 105 may identify a handover type based on the handover capabilities of the UE 115.

In response to the transmitted indication of handover capabilities, the UE 115 may receive an indication of the handover type from the serving base station 105 and perform the handover procedure accordingly. In some cases, the handover type may be indicated on a per-bearer basis, or separately for uplink and downlink. If the handover type is lossy, the UE 115 may discard one or more packets of buffered data. For example, the UE 115 may discard downlink packets by passing them to the application layer without re-ordering or re-encrypting the packets. The UE 115 may continue to properly process any remaining packets. In another example, the UE 115 may discard uplink packets buffered at the PDCP buffer. The uplink packets selected for discarding may be packets that have been sent over the air but which have not yet be received or acknowledged by the intended recipient (e.g., the serving base station 105). Any remaining uplink packets may be maintained for eventual transmission to the serving base station 105 or the target base station 105.

As described herein, wireless communications system 100 may support techniques for a TCP aware handover type determination. For example, a serving base station 105 may include a base station handover manager 101. The base station handover manager 101 may be an example of the base station handover manager discussed with reference to FIGS. 8 through 11. The base station handover manager 101 may be configured for the presently described TCP aware handover type determination, such as is described with reference to FIGS. 2 through 3D. The serving base station 105 may be in communication with a UE 115. The UE 115 may have an active TCP session established with a destination or client device (e.g., a remote UE 115, a remote server, etc.) via the serving base station 105.

The serving base station 105 may identify a type of handover procure to use based on connection parameters associated with the devices involved in the handover. For example, the serving base station 105 may determine to use a lossy handover procedure (e.g., a handover procedure in which buffered data can be discarded) or a lossless handover procedure (e.g., a handover procedure in which buffered packets are maintained). The serving base station 105 may obtain the connection parameters upon which the handover type decision is based by monitoring a connection and/or by receiving the connection parameters from another entity (e.g., from the UE 115 or target base station involved in the handover, or from the network). The connection parameters may include indications of various characteristics (e.g., data rate, throughput, TCP version, communication link type, loading, packet size, delay, round trip time, etc.) associated with various communication links (e.g., connections or TCP sessions) or devices involved in the handover.

When a lossy handover is selected for use, the serving base station 105 may identify packets of buffered data to discard. The selected packets may be associated with the UE 115 involved in the handover (e.g., addressed to the UE 115) and may be buffered at a PDCP buffer. In some cases, the selected packets are packets that have been sent to the UE 115 but which have not yet been received or acknowledged by the UE 115. Thus, a portion of buffered packets may be discarded and a portion of buffered packets may be maintained (e.g., for forwarding to the target base station). For example, the serving base station 105 may discard a portion of the downlink packets addressed to the UE 115 and forward the remaining downlink packets to the target base station 105. The serving base station 105 may also, discard a portion of uplink packets received from the UE 115 and deliver the remaining packets to an upper layer or to a next hop. In other cases, all of the uplink and/or downlink packets associated with the UE that are ready to send may be discarded. When a lossless handover is selected for use, the serving base station 105 may maintain buffered data associated with the UE 115 and may forward it to the target base station 105. The serving base station 105 may notify the UE 115 and/or the target base station 105 of the type of handover procedure to employ. In other cases, the target base station 105 may determine which type of handover procedure to employ and may inform the serving base station 105.

In some cases, the serving base station 105 may monitor a throughput metric or performance associated with a connection between the UE 115 and the serving base station 105. During a handover, the serving base station 105 may identify an expected throughput metric or performance associated with a second connection between the UE 115 and a target base station 105. The serving base station 105 may use the monitored throughput metric and the expected throughput metric to identify a handover loss metric. The handover loss metric may be for a handover of the UE 115 from the serving base station 105 and the target base station 105. The serving base station 105 may perform the handover procedure of the UE 115 to the target base station 105 according to the handover loss metric.

The target base station 105 may receive a handover request message from the serving base station 105. The target base station 105 may transmit a connection parameter associated with a connection between the target base station 105 and the UE 115 to the serving base station 105. The connection parameter may include, or be indicative of, information associated with an effective throughput rate associated with a TCP session established via the target base station 105. The target base station 105 may receive a handover procedure message from the serving base station that includes an indication of the handover loss metric. The target base station 105 may perform a handover procedure of the UE 115 to the target base station 105 according to the handover loss metric.

Figure 2:
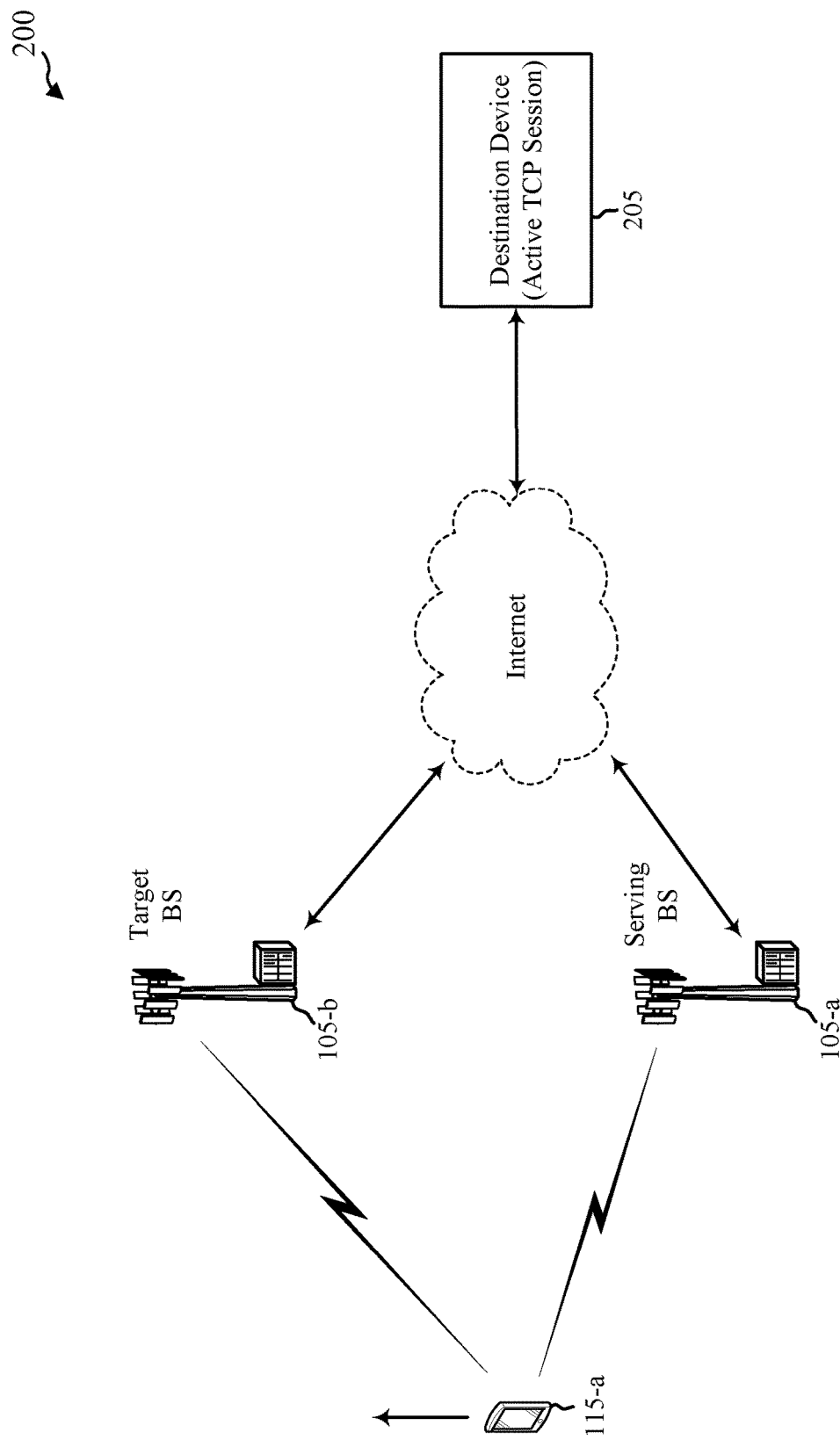
FIG. 2 illustrates an example of a wireless communications system that supports transmission control protocol aware handover type determination in accordance with aspects of the present disclosure.

FIG. 2 illustrates an example of a wireless communications system 200 for TCP aware handover type determination. Wireless communications system 200 may include a serving base station 105-*a*, a target base station 105-*b*, and a UE 115-*a*, which may be examples of the corresponding devices described with reference to FIG. 1. Wireless communications system 200 may also include a destination device 205, which may be an example of a remote UE 115, a remote server, a remote website, etc, and which may be referred to herein as a client device. Generally, the UE 115-*a* may have an active session with the destination device 205 that includes exchanging data packets according to TCP/IP procedures.

UE 115-*a* may be within a coverage area of, and connected to, serving base station 105-*a*. UE 115-*a* may use a connection with serving base station 105-*a* to support an active TCP session with destination device 205. The active TCP session may include the transfer of data packets between UE 115-*a* and the destination device 205, via serving base station 105-*a* and the Internet, in some examples. UE 115-*a* may be mobile and moving away from the coverage area of serving base station 105-*a* and into the coverage area of target base station 105-*b*.

In some cases, serving base station 105-*a* may monitor, receive, or otherwise determine connection parameters associated with the connection between the serving base station 105-*a* and the UE 115-*a*. For example, the connection parameters may include aspects of the active TCP session between the UE 115-*a* and the destination device 205. In some aspects, the connection parameters may include of an effective throughput rate associated with the TCP session established via the serving base station 105-*a*, a round trip time (RTT) for an air interface between the UE 115-*a* and the serving base station 105-*a*, a loading of the serving base station 105-*a*, and/or a link data rate between the UE 115-*a* and the serving base station 105-*a*.

In some aspects, monitoring or determining the connection parameters may include monitoring a connection status of the UE 115-*a*. The connection status of the UE 115-*a* may include the effective data rate of the UE 115-*a* connection, the delay between the UE 115-*a* and the serving base station 105-*a*, etc.

In some aspects, the connection parameters may include a session status of the TCP session or connection of the UE 115-*a*. The session status may include the effective data rate of the TCP connection, the delay time between the serving base station 105-*a* and a remote TCP node (e.g., the destination device 205), the TCP version of the TCP session, the packet size of the TCP session (e.g., the maximum segment size, maximum transmission unit, etc.), etc. In some examples, monitoring the connection parameters may include the serving base station 105-*a* identifying a throughput ratio threshold (K) that is based, at least in certain aspects, on the TCP version of the TCP session.

The serving base station 105-*a* may monitor and/or receive the connection parameters continuously, periodically, or based on a trigger event (such as a handover decision triggering event). UE 115-*a* may supply measurement reports to serving base station 105-*a* that indicate a handover is imminent. The measurement reports may indicate that target base station 105-*b* is a candidate for handover of the UE 115-*a*. Thus, serving base station 105-*a* may make a handover decision based on the measurement reports. The serving base station 105-*a* may transmit a handover request message to the target base station 105-*b* via a backhaul link, for example. The target base station 105-*b* may perform admission control procedures for the handover and respond by transmitting a handover request acknowledgement message to the serving base station 105-*a*. The handover request acknowledgement message may include a connection parameter, in some examples.

The serving base station 105-*a* may identify expected connection parameters associated with a connection between the UE 115-*a* and the target base station 105-*b*. The serving base station 105-*a* may identify the expected connection parameters based on, or from, a message received from the target base station 105-*b*. The expected connection parameters may be based on or otherwise include an estimated effective throughput rate associated with the TCP session established via the target base station 105-*b*, an estimated RTT for an air interface between the UE 115-*a* and the target base station 105-*b*, an estimated loading of the target base station 105-*b*, an expected data rate of a TCP session associated with the target base station 105-*b*, a TCP packet size associated with the target base station 105-*b*, an expected delay (e.g., round trip time) of an air interface between the target base station 105-*b* and a client device, an estimated throughput metric associated with the target base station, and/or an estimated link data rate between the UE 115-*a* and the target base station 105-*b*.

In some examples, identifying the expected connection parameters may include receiving and/or determining an expected connection status of the UE 115-*a* with the target base station 105-*b*. For example, the serving base station 105-*a* may gather information from the target base station 105-*b* as to what sort of connection the target base station 105-*b* can be expected to support for UE 115-*a*. In some aspects, the expected connection status of the UE 115-*a* may include or be based on the serving base station 105-*a* transmitting a handover request to the target base station 105-b. The serving base station 105-a may receive a handover request acknowledgement from the target base station 105-b that includes one or more connection parameters associated with the target base station 105-b. For example, the handover request acknowledgment may include an indication of the expected data rate of a TCP connection for the UE 115-a and/or an indication of the expected delay of a TCP connection via the target base station 105-b.

The serving base station 105-a may identify, based on the connection parameters associated with the serving base station 105-a and the connection parameters associated with the target base station 105-b, a handover type. The handover type may be identified based on a handover loss metric associated with a handover procedure of the UE 115-a from the serving base station 105-a to the target base station 105-b. In some examples, the handover loss metric may be indicative of a lossy handover where the serving base station 105-a refrains from forwarding UE 115-a addressed buffered packets to the target base station 105-b. In some examples, the handover loss metric may be indicative of a lossless handover where the serving base station 105-a forwards UE 115-a addressed buffered packets to the target base station 105-b. The determination of whether to perform a lossless handover may be based on, for example, the connection status, the session status of the TCP connection, and/or the expected connection status of the UE 115-a that corresponds to the target base station 105-b.

In some aspects, identifying the handover loss metric may utilize TCP congestion avoidance phase behavior to determine if the packet loss will result in unwanted degradation of the effective data rate (achieved by TCP after handover). TCP procedures reduce the congestion window from the current congestion window size W to a portion of W, e.g., K*W, when a light congestion event, e.g., a packet loss, is detected. In traditional TCP Cubic implementation, K=0.8. In previous TCP implementations such as TCP Reno, K=0.5. According to aspects of the present disclosure, if the current TCP congestion window is large enough such that after the reduction a lossy handover the congestion window is still large enough to fully utilize the new data rate (e.g., the data rate offered by the target base station 105-b), the network may not perform a lossless handover. Effectively, a lossless handover may be used when:

$$R_{new}(D_{tNB2UE}D_{tNB2REMOTE})/R_{current}(D_{sNB2UE}+D_{sNB2REMOTE})>K$$

Where $R_{new}$ is the expected data rate of a TCP connection at the target base station 105-b (e.g., eNB), $R_{current}$ is the currently utilized data rate at the serving base station 105-a. In some aspects, $R_{current}$ may be smaller than the available data rate for UE 115-a or a particular TCP connection due to network congestion or a short-lived TCP session. $R_{new}$ may be predicted in a way that reflects the allocated data rate to the TCP connection at the target base station 105-b.

In some aspects, identifying the handover loss metric may include a determination based on a comparison of a throughput metric such as bandwidth delay product (BDP), e.g., the congestion window threshold and a window ratio. The BDP threshold may be determined based on the TCP version of the TCP connection. The window ratio may be computed based on the effective data rate of the TCP connection at the serving base station 105-a, a delay of UE 115-a to the serving base station 105-a, a delay of the serving base station 105-a to the remote TCP node (e.g., destination device 205), the expected data rate of the TCP connection at the target base station 105-b, the expected delay of UE 115-a to the target base station 105-b, and/or the expected delay of target base station 105-b to the remote TCP node.

The serving base station 105-a may identify the handover type (e.g., based on the handover loss metric) and perform a handover procedure of the UE 115-a to the target base station 105-b accordingly. In some aspects, the serving base station 105-a may transmit an indication of the handover type or the handover loss metric to the target base station 105-b. Thus, the serving base station 105-a may inform the target base station 105-b of the type of handover being performed. The type of handover may indicate whether or not data forwarding from the serving base station 105-a to the target base station 105-b is performed.

According to the techniques described herein, wireless communications system 200 may support aspects of a handover type decision node, e.g., serving base station 105-a and/or UE 115-a, that monitors the current TCP connection status of UE 115-a. The network may monitor the effective data rate utilized by the TCP connection and estimate the delay of the end-to-end TCP connection. This information may be used to estimate the lower bound of a current TCP congestion window size, e.g., the effective BDP or $R_{current}$ ($D_{sNB2UE}+D_{sNB2REMOTE}$). Upon handover, the handover type decision node obtains an expected BDP, e.g., $R_{new}$ ($D_{tNB2UE}+D_{tNB2REMOTE}$), based on information provided by the target base station 105-b. The handover type decision node decides whether to perform a lossless handover based on the equation. The decision may be provided to the target base station 105-b. If a lossless handover is selected, the network may forward buffered data from the serving base station 105-a to the target base station 105-b. Otherwise, the serving base station 105-a may drop some or all of the buffered data and forward the remaining portion of the buffered data (to reduce TCP retransmissions) to the target base station 105-b.

Figure 3A:
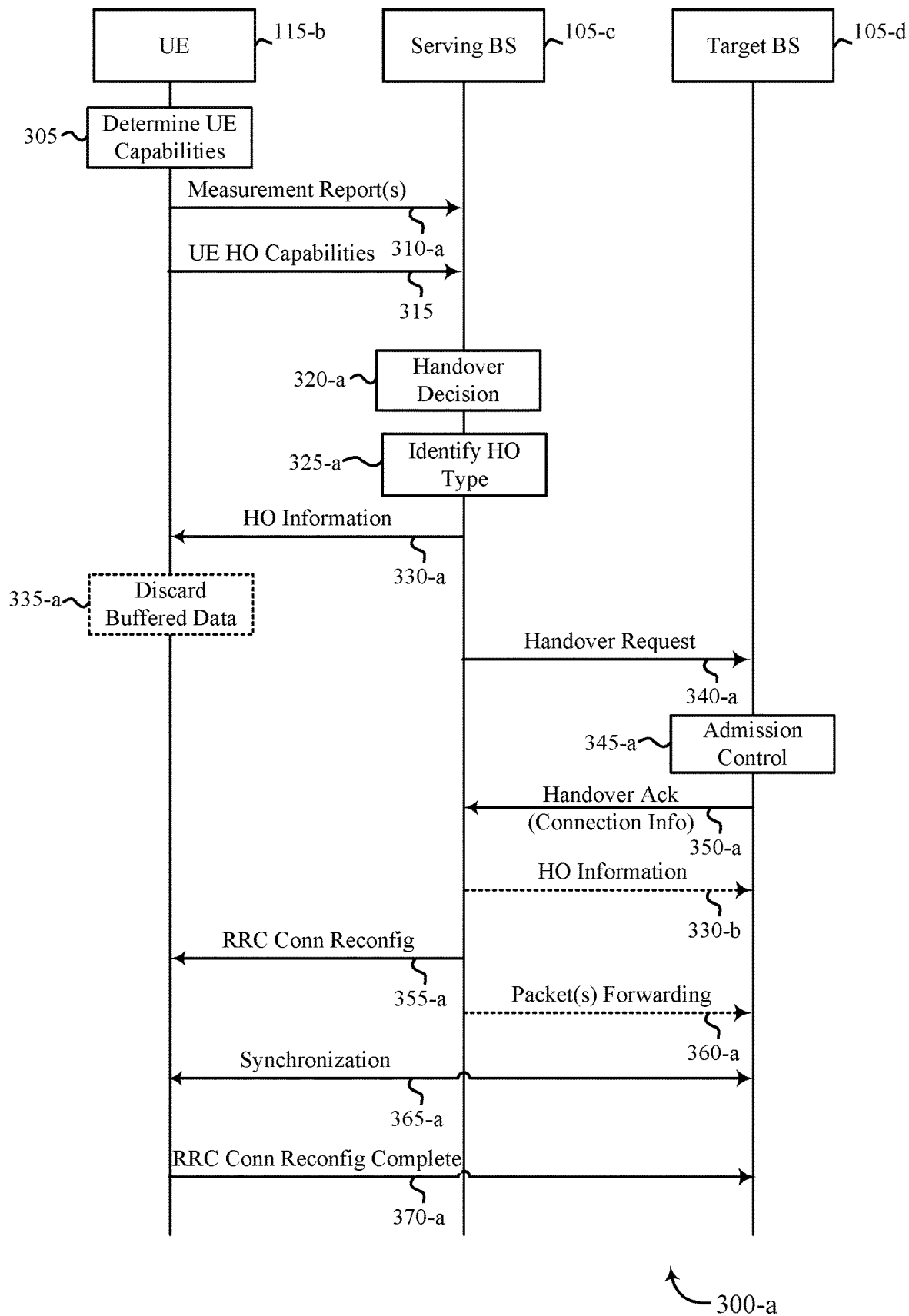
FIGS. 3A-3D illustrate examples of process flows in a system that supports transmission control protocol aware handover type determination in accordance with aspects of the present disclosure.

FIG. 3A illustrates an example of a process flow 300-a for TCP aware handover type determination in accordance with various aspects of the present disclosure. Process flow 300-a may include a serving base station 105-c, a target base station 105-d, and a UE 115-b, which may be examples of the corresponding devices described with reference to FIGS. 1-2. Process flow 300-a may illustrate the actions of, and communications by, devices involved in a UE-centric handover type determination.

At 305, the UE 115-b may determine whether it has the capability to maintain data that is buffered at the UE 115-b during a handover procedure. In some cases, the UE 115-b may make the determination autonomously (e.g., upon network entry). In other cases, the UE 115-b may make the determination based on a trigger (e.g., a message, such as a UECapabilityEnquiry, from the serving base station 105-c). In the example depicted in process flow 300-a, the UE 115-b may be within a coverage area of, and connected to, the serving base station 105-c. The UE 115-b may be mobile and moving away from the coverage area of the serving base station 105-c and into the coverage area of the target base station 105-d. At 305, the UE 115-b may supply measurement reports to serving the base station 105-c that indicate a handover is imminent. The measurement reports may indicate that the target base station 105-d is a candidate for handover of the UE 115-b, e.g., based on a measured signal strength from the target base station 105-d. In some cases, the measurement report(s) 310-a may include an indication of the handover capabilities of the UE 115-b. Alternatively, the UE 115-b may send an indication of its handover capabilities in a separate message sent at 315. The indication of UE handover capabilities may occur upon entry to the network (e.g., after establishing a connection to the network via the serving base station 105-c) or in response to a prompt from the serving base station 105-c. In some cases, the UE 115-b may indicate its handover capabilities separately for the uplink and downlink. For example, the UE 115-b may send a first indication of the capability of the UE 115-b to maintain or discard buffered data for the uplink and a second indication of the capability of the UE 115-b to maintain or discard buffered data for the downlink.

At 320-a, the serving base station 105-c may make a handover decision based on the measurement reports. Before or after the handover decision, the serving base station 105-c may, at 325-a, identify the handover type based on the determined capabilities of the UE 115-b (e.g., based on the UE handover capabilities received from the UE 115-b). For example, the serving base station 105-c may determine whether the UE 115-b supports lossy handovers (e.g., the discarding of buffered data) and/or whether UE 115-b supports lossless handovers (e.g., maintenance of buffered data). Based on this information, the serving base station 105-c may determine which type of handover procedure (e.g., lossy or lossless) to employ for the handover of the UE 115-b. For instance, if the UE 115-b does not support lossy handovers, the serving base station 105-c may determine to use lossless handovers. If the UE 115-b does support lossy handovers, the serving base station 105-c may determine to use the lossy handovers. In some cases, other information such as connection parameters for the serving base station 105-d and/or connection parameters for the target base station 105-d may factor into the handover type decision.

After determining the handover type, the serving base station 105-c may, at 330-a, send handover information to the UE 115-b that indicates to the UE 115-b to maintain or discard data buffered at the UE 115-b. The indication may be responsive to the handover capability indication sent from UE 115-b. In the present example, the handover information may indicate that one or more packets of buffered data are to be discarded. Accordingly, at 335-a, the UE 115-b may discard one or more packets of buffered data (e.g., prior to establishing a connection with the target base station 105-d). The discarded packets may be packets buffered at a PDCP buffer that have been sent over the air (e.g., to the serving base station 105-c) but not yet been received or acknowledged by the intended recipient. In some cases, the UE 115-b may maintain buffered data that has not yet been sent over the air despite an indication to discard buffered data (e.g., the UE 115-b may maintain buffered data that has not yet been sent over the air). In other cases, the UE 115-b may discard all buffered data that is ready to send (e.g., data ready to send over the connection with the serving base station 105-c). If the handover information indicates that buffered data is to be maintained, UE 115-b may refrain from discarding buffered data and, in some cases, transmit buffered data to the serving base station 105-c or the target base station 105-d.

In some cases, the handover information sent at 330-a may include separate handover indications for uplink and downlink. For example, the handover information may include a first indication to maintain or discard buffered data for the uplink and a second indication to maintain or discard buffered data for the downlink. Thus, different type of handover procedures may be used for uplink and downlink. When buffered data is to be discarded for the uplink, the UE 115-b may discard some or all of the data buffered at the PDCP buffer. Any remaining packets may be delivered to an upper layer or to a next hop for uplink. When buffered data is to be maintained for the uplink, all of the buffered data may be delivered to an upper layer or next hop for uplink. Thus, the UE 115-b may transmit all or some of its buffered data to the target base station 105-d. With regards to the downlink, if buffered data is to be discarded (e.g., the handover is lossy), the UE 115-b may refrain from re-ordering and/or re-encrypting packets and instead forward the packets (e.g., from the PDCP buffer) to the application layer. The UE 115-b may also refrain from sending PDCP status information to other layers. In some examples, the handover information may include a separate indication for each bearer. That is, the type of handover to use may be indicated on a per-bearer basis.

At 340-a, the serving base station 105-c may transmit a handover request message to the target base station 105-d via a backhaul link, for example. At 345-a, the target base station 105-d may perform admission control procedures for the handover and respond at 350-a by transmitting a handover request acknowledgement message to the serving base station 105-c. The handover request acknowledgement message may include one or more connection parameters, in some examples. The connection parameter(s) or information may include or may provide an indication of an expected or estimated effective data rate, packet size, latency (e.g., round trip time), throughput, TCP link version, communication link type, etc. associated with a connection or session between the UE 115-b with target base station 105-d.

In some cases, the serving base station 105-c may transmit, and the target base station 105-d may receive, handover information associated with the UE 115-b at 330-b. The handover information may include an indication of the type of handover procedure to be employed for the UE 115-b. Thus, the serving base station 105-c may inform the target base station 105-d of the type of handover being performed. The type of handover may indicate whether or not data forwarding from the serving base station 105-c to the target base station 105-d is performed. Thus, the target base station 105-d may determine whether the handover with UE 115-b is to be lossy or lossless based on the handover information.

At 355-a, the serving base station 105-c may transmit an RRC connection reconfiguration message to the UE 115-b. The RRC connection reconfiguration message may instruct the UE 115-b to perform the handover procedure of the UE 115-b from the serving base station 105-c to the target base station 105-d. When the handover information indicates that all or at least some of the UE 115-b addressed buffered packets are to be forwarded, at 360-a the serving base station 105-c may forward the packets to the target base station 105-d.

At 365-a, the UE 115-b and the target base station 105-d may perform synchronization steps to support time/frame alignment, resource allocation, etc., for the establishment of the connection between the UE 115-b and the target base station 105-d. At 370-a, the UE 115-b may complete the handover procedure by transmitting an RRC connection reconfiguration complete message to the target base station 105-d. At this point, the target base station 105-d is the new serving base station of UE 115-b.

Figure 3B:
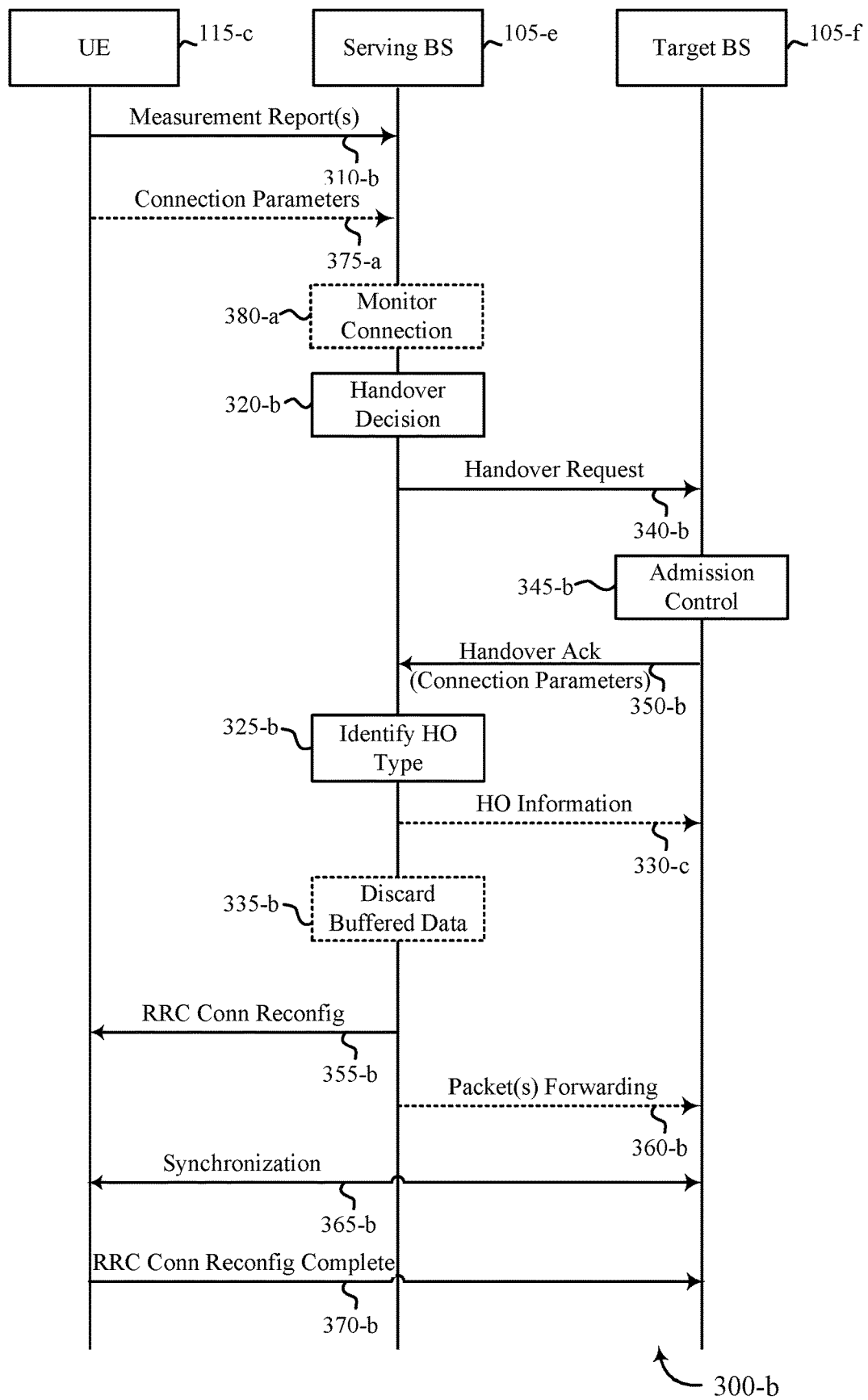

FIG. 3B illustrates an example of a process flow 300-b for TCP aware handover type determination in accordance with various aspects of the present disclosure. Process flow 300-b may include a serving base station 105-e, a target base station 105-f, and a UE 115-c, which may be examples of the corresponding devices described with reference to FIGS. 1-3A. Process flow 300-b may illustrate the actions and communications of devices involved in a serving base station-centric handover type determination.

The UE 115-c may be within a coverage area of, and connected to, the serving base station 105-d. The UE 115-c may be mobile and moving away from the coverage area of the serving base station 105-e and into the coverage area of the target base station 105-f. At 310-b, the UE 115-c may supply measurement reports to the serving base station 105-e that indicate a handover is imminent. The measurement reports may indicate that the target base station 105-f is a candidate for handover of the UE 115-c, e.g., based on a measured signal strength from the target base station 105-f. In some cases the UE 115-c may also, for example at 375-a, send an indication of the status of the connection between the serving base station 105-e and the UE 115-c. The indication may include connection parameters associated with the connection such as the effective data rate of the TCP session established between the UE 115-c and the serving base station 105-e, the TCP version of the session, the delay (e.g., round trip time) for an air interface between the UE 115-c and the serving base station 105-e), a packet size of TCP data communication over the TCP session, etc. In some cases, the UE 115-c may not send the connection parameters—instead, the serving base station 105-e may determine the connection parameters by monitoring the connection between the UE 115-c and the serving base station 105-e at 380-a. In some cases, the serving base station 105-e may determine the connection parameters associated with the serving base station 105-e by using a combination of information from the UE 115-c and information obtained via monitoring the connection link.

At 320-b, serving base station 105-e may make a handover decision based on the measurement reports. At 340-b, the serving base station 105-e may transmit a handover request message to the target base station 105-f. At 345-b, the target base station 105-f may perform admission control procedures for the handover and respond at 350-b by transmitting a handover request acknowledgement message to the serving base station 105-e. The handover request acknowledgement message may include one or more connection parameters. The connection parameter(s) or information may include or may provide an indication of the expected effective data rate for a connection or TCP session between the UE 115-c and target base station 105-f, the estimated round trip time for an air interface between the UE 115-c and the target base station 105-f, the estimated round trip time for an air interface between the target base station 105-f and a TCP client device, the estimated effective throughput metric (e.g., BDP) associated with a TCP session established via the target base station 105-f, etc.

At 325-b, the serving base station 105-e may identify the handover type based on determining the handover capabilities supported by the devices involved in the handover, as described with reference to FIG. 2. In some aspects, identifying the handover capabilities may include determining whether to perform a lossy or lossless handover of the UE 115-c to the target base station 105-f. The determination of whether to perform a lossy or lossless handover may be based on the connections parameter(s) associated with the target base station 105-f (e.g., the connection status, the session status of the TCP connection, the expected connection status between the UE 115-c and the target base station 105-f, etc.). In some cases, the handover type identification may be based on the BDP. For example, the identification may be based on the effective BDP computed for the connection between the UE 115-c and the serving base station 105-e (e.g., using the connection parameters associated with the serving base station 105-e). The identification may also be based on the expected BDP computed for the connection between the UE 115-c and the target base station 105-f (e.g., using the connection parameters associated with the target base station 105-f). In some cases, the target base station 105-e may compare the computed BDP to each other or to one or more thresholds. Based on the comparison(s), the target base station 105-e may determine whether or not buffered data can be discarded during a handover procedure of the UE 115-c.

In some cases, the handover type may be identified based on a policy. The policy may define which handover type to use in various situations and based on connection parameters of the devices involved in the handover (e.g., the type of communication link associated with the serving base station 105-e and/or the type of communication link associated with the target base station 105-f). In one example, the policy may include combinations of link types that could be involved in a handover (e.g., from LTE to 5G, from 5G to LTE, from 5G to 5G, etc.) and specify which link type to use for each combination. The serving base station 105-e may determine which link types are involved in a handover based on connection parameters associated with the serving base station 105-e and the target base station 105-f (e.g., based on handover context such as the current TCP connection status). In some cases, the policy may include connection parameters such as the loading of the serving base station 105-e, the loading of the target base station 105-f, the version of the TCP session established via the serving base station 105-e, the packet size of TCP data communicated over the TCP session, the throughput of the TCP session, the throughput of a communication link associated with the target base station 105-f and the UE 115-c, and/or the estimated round trip time of the communication link associated with the UE 115-c and the target base station 105-f. The policy may be pre-configured or received from an external source (e.g., during X2 setup). In some cases, the policy may assume certain connection characteristics or parameters, which may simplify the handover type identification process. In some cases, the identification of handover type may be based on the availability of a backhaul link between the serving base station 105-e and the target base station 105-f. If a backhaul link is not available (e.g., data cannot be forwarded to the target base station 105-f), the serving base station 105-e may determine to use a lossy handover.

In some examples, the serving base station 105-e additionally or alternatively identify the handover loss metric at 325-b, as described with reference to FIG. 2. For example, the serving base station 105-e may identify the handover loss metric based on a monitored throughput metric, based on an expected throughput metric associated with a connection between the UE 115-c and the target base station 105-f, etc. In some examples, the handover loss metric may be a lossy handover metric where the serving base station 105-e refrains from forwarding UE 115-c addressed buffered packets to the target base station 105-f. In some examples, the handover loss metric may be a lossless handover metric where the serving base station 105-e forwards UE 115-c addressed buffered packets to the target base station 105-f In some aspects, identifying the handover loss metric may include determining whether to perform a lossless handover of the UE 115-c to the target base station 105-f (e.g., the handover type identification may be based on the handover loss metric). The determination of whether to perform a lossless handover may be based on the connection status, the session status of the TCP connection and/or the expected connection status of the UE 115-c that corresponds to the target base station 105-f.

In some cases the serving base station 105-e may, at 330-c, transmit handover information associated with UE 115-c to the target base station 105-f. The handover information may include an indication of the type of handover procedure to be employed for UE 115-c. If the handover is determined to be lossy, the serving base station 105-e may at 335-b, discard one or more packets of buffered data addressed to the UE 115-c (e.g., downlink packets). Any remaining downlink packets intended for the UE 115-c may be forwarded to the target base station 105-f (e.g., at 360-b). When the handover procedure type is lossy, the serving base station 105-e may also discard one or more uplink packets from the UE 115-c. Any remaining uplink packets from the UE 115-c may be delivered to an upper layer or to a next hop for uplink. If the handover procedure type is lossless, UE 115-c may refrain from discarding downlink or uplink buffered data and, in some cases, transmit the buffered data to target base station 105-f.

At 355-b, the serving base station 105-e may transmit an RRC connection reconfiguration message to the UE 115-c instructing the UE 115-c to perform the handover procedure of the UE 115-c from the serving base station 105-e to the target base station 105-f. When the handover information indicates that all or at least some of the UE 115-c addressed buffered packets are to be forwarded, at 360-b the serving base station 105-e may forward the packets to the target base station 105-f.

At 365-b, the UE 115-c and the target base station 105-f may perform synchronization steps to support time/frame alignment, resource allocation, etc., for the establishment of the connection between the UE 115-c and the target base station 105-f. At 370-b, the UE 115-c may complete the handover procedure by transmitting an RRC connection reconfiguration complete message to the target base station 105-f. At this point, the target base station 105-f is the new serving base station of UE 115-c.

Figure 3C:
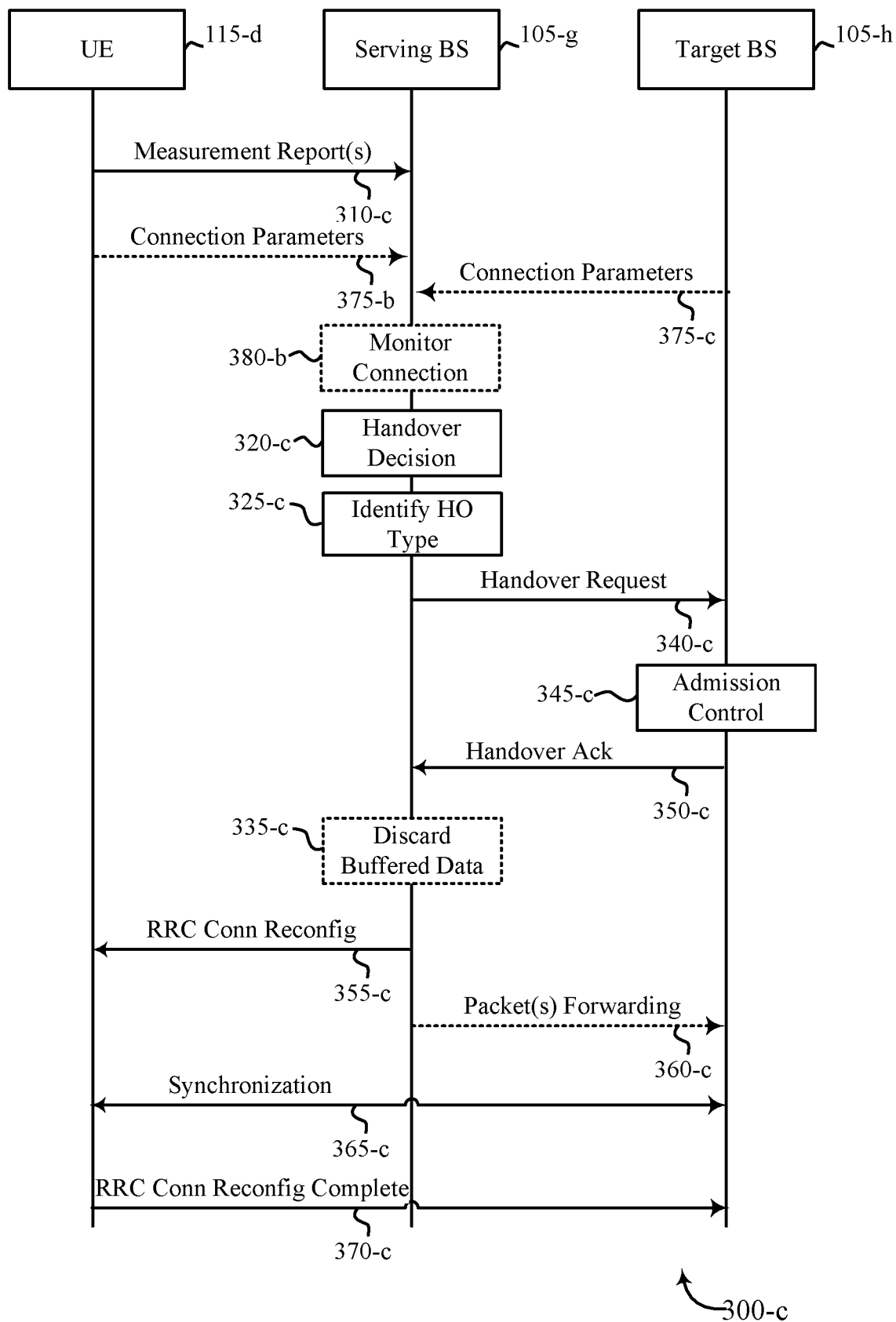

FIG. 3C illustrates an example of a process flow 300-c for TCP aware handover type determination in accordance with various aspects of the present disclosure. Process flow 300-c may include a serving base station 105-g, a target base station 105-h, and a UE 115-d, which may be examples of the corresponding devices described with reference to FIGS. 1-3B. Process flow 300-c may illustrate the actions and communications of devices involved in a serving base station-centric handover type determination.

The UE 115-d may be within a coverage area of, and connected to, the serving base station 105-g. The UE 115-d may be mobile and moving away from the coverage area of the serving base station 105-g and into the coverage area of the target base station 105-h. At 310-c, the UE 115-d may supply measurement reports to the serving base station 105-g that indicate a handover is imminent. The measurement reports may indicate that the target base station 105-h is a candidate for handover of the UE 115-g. In some cases, the UE 115-d may, at 375-b, send an indication of the status of the connection between the serving base station 105-g and the UE 115-d. The connection status may include one or more connection parameters. In some cases, the UE 115-d may not send the connection status—instead, the serving base station 105-g may determine the connection parameters by monitoring, for example at 380-b, the connection between the UE 115-d and the serving base station 105-g.

At 375-c, the target base station 105-h may send, and the serving base station 105-g may receive, connection parameters associated with target base station 105-g. In some cases, the connection parameters may be sent in non-UE-specific messages (e.g., in a load information message or in X2 setup messages such as X2 setup request or X2 setup response) over the X2 interface between the serving base station 105-g and the target base station 105-h. In some examples, the connection parameters are sent to the serving base station 105-g from the network (e.g., from Operations, Administration, and Maintenance (OAM)). At 320-c, serving base station 105-g may make a handover decision based on the measurement reports. At 325-c, the serving base station 105-g may identify the handover type based on determining the handover capabilities supported by the devices involved in the handover procedure, as described with reference to FIG. 2. In some aspects, identifying the handover type may include determining whether to perform a lossy or lossless handover of the UE 115-d to the target base station 105-h. The determination of whether to perform a lossy or lossless handover may be based on the connections parameter(s) associated with the target base station 105-h and/or the connection parameter(s) associated with the serving base station 105-g.

At 340-c, the serving base station 105-g may transmit a handover request message to the target base station 105-h. The handover request message may include an indication of the handover type and/or handover capabilities determined by the serving base station 105-g. In other cases, the handover type may be conveyed by non-UE-specific messages (e.g., in a load information message or in X2 setup messages) over the X2 interface between the serving base station 105-g and the target base station 105-h. At 345-c, the target base station 105-h may perform admission control procedures for the handover and respond at 350-c by transmitting a handover request acknowledgement message to the serving base station 105-g.

At 335-c, the serving base station 105-e may, if the handover is determined to be lossy, discard one or more packets of buffered data addressed to the UE 115-d (e.g., downlink packets). Any remaining downlink packets intended for the UE 115-d may be forwarded to the target base station 105-g (e.g., at 360-c). When the handover procedure type is lossy, the serving base station 105-e may also, at 335-c, discard one or more uplink packets from the UE 115-d. Any remaining uplink packets from the UE 115-d may be delivered to an upper layer or to a next hop for uplink. If the handover procedure type is lossless, UE 115-d may refrain from discarding buffered downlink or uplink data associated with the UE 115-d and, in some cases, transmit the buffered data to the target base station 105-h.

At 355-c, the serving base station 105-g may transmit an RRC connection reconfiguration message to the UE 115-d that instructs the UE 115-d to perform the handover procedure of the UE 115-d from the serving base station 105-e to the target base station 105-h. In some cases, the serving base station 105-g may also indicate to the UE 115-d which type of handover procedure to employ (e.g., whether or not buffered data can be discarded). At 360-c the serving base station 105-g may forward remaining packets of buffered data to the target base station 105-h. At 365-c, the UE 115-d and the target base station 105-h may perform synchronization steps to support time/frame alignment, resource allocation, etc., for the establishment of the connection between the UE 115-d and the target base station 105-h. At 370-c, the UE 115-d may complete the handover procedure by transmitting an RRC connection reconfiguration complete message to the target base station 105-h. At this point, the target base station 105-g is the new serving base station of UE 115-d.

Figure 3D:
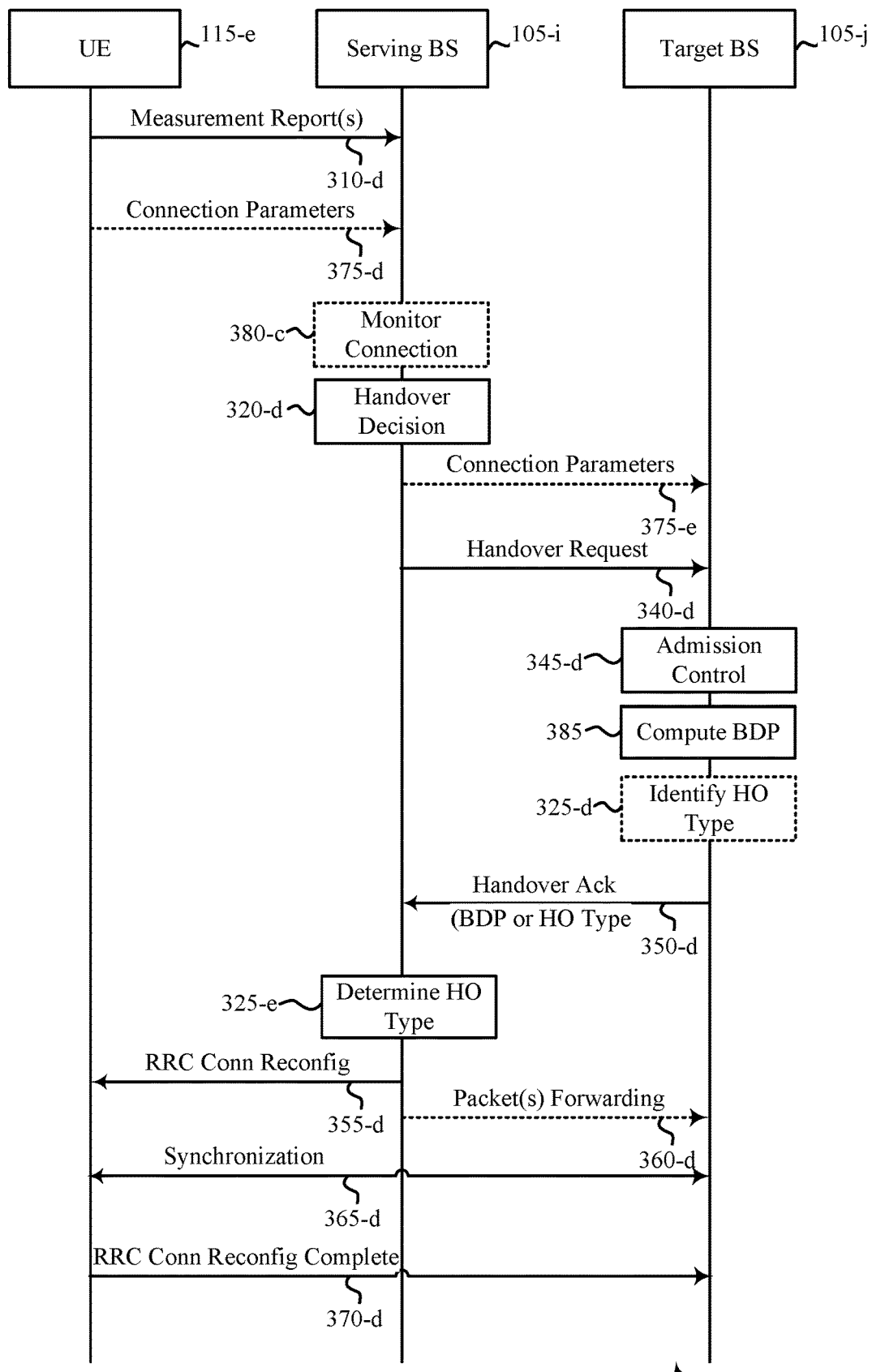

FIG. 3D illustrates an example of a process flow 300-d for TCP aware handover type determination in accordance with various aspects of the present disclosure. Process flow 300-*d* may include a serving base station 105-*i*, a target base station 105-*j*, and a UE 115-*e*, which may be examples of the corresponding devices described with reference to FIGS. 1-3C. Process flow 300-*d* may illustrate the actions and communications of devices involved in a target base station-centric handover type determination.

At 310-*d*, the UE 115-*e* may send measurement reports to the serving base station 105-*i* that indicate a handover is imminent. The measurement reports may indicate that the target base station 105-*j* is a candidate for handover of the UE 115-*d*. In some cases, the UE 115-*e* may also, for example at 375-*d*, send an indication of the status of the connection between the serving base station 105-*i* and the UE 115-*e*. The indication may include connection parameters associated with the serving base station 105-*i*. In some cases, the serving base station 105-*i* may determine the connection parameters by monitoring the connection between the UE 115-*e* and the serving base station 105-*i* at 380-*c*.

At 320-*d*, serving base station 105-*i* may make a handover decision based on the measurement reports. At 375-*e*, the serving base station 105-*i* may send connection parameters associated with the serving base station 105-*i* to the target base station 105-*j*. In some examples, the connection parameters are sent to the target base station 105-*j* from the network (e.g., from the OAM). At 340-*d*, the serving base station 105-*i* may send a handover request to the target base station 105-*j*. In some cases, the connection parameters are included in the handover request (e.g., the serving base station 105-*i* does not send a separate message for the connection parameters at 375-*d*). At 345-*d*, the target base station 105-*j* may perform admission control procedures for the handover. The target base station 105-*j* may, at 385, compute the effective BDP for the connection between the UE 115-*e* and the serving base station 105-*i* (e.g., using the connection parameters associated with the serving base station 105-*i*). The target base station 105-*j* may additionally or alternatively compute the expected BDP for a connection between the UE 115-*e* and the target base station 105-*j* (e.g., using connection parameters associated with the target base station 105-*j*).

At 325-*d*, the target base station 105-*j* may identify handover type based on the computed BDP. In some cases, the target base station 105-*j* may compare the computed BDP to each other or to one or more thresholds. Based on the comparison(s), the target base station 105-*j* may determine whether or not buffered data can be discarded during a handover procedure of the UE 115-*e*. At 350-*d*, the target base station may respond to the handover request respond by transmitting a handover request acknowledgement message to the serving base station 105-*i*. The target base station 105-*j* may send an indication of the BDP and/or handover type in the handover acknowledgement or in a separate message. At 325-*e*, the serving base station 105-*i* may determine the handover type based on handover information from the target base station 105-*j* (e.g., based on the BDP and/or handover type indicated by the target base station 105-*j*).

At 355-*d*, the serving base station 105-*i* may transmit an RRC connection reconfiguration message to the UE 115-*e*. The RRC connection reconfiguration message may instruct the UE 115-*e* to perform the handover procedure of the UE 115-*e* from the serving base station 105-*i* to the target base station 105-*j*. When the handover information indicates that all or at least some of the UE 115-*e* addressed buffered packets are to be forwarded, at 360-*d* the serving base station 105-*c* may forward the packets to the target base station 105-*j*. At 365-*d*, the UE 115-*e* and the target base station 105-*j* may perform synchronization steps for the establishment of the connection between the UE 115-*e* and the target base station 105-*j*. At 370-*d*, the UE 115-*e* may complete the handover procedure by transmitting an RRC connection reconfiguration complete message to the target base station 105-*j*. At this point, the target base station 105-*j* is the new serving base station of UE 115-*e*.

Figure 4:
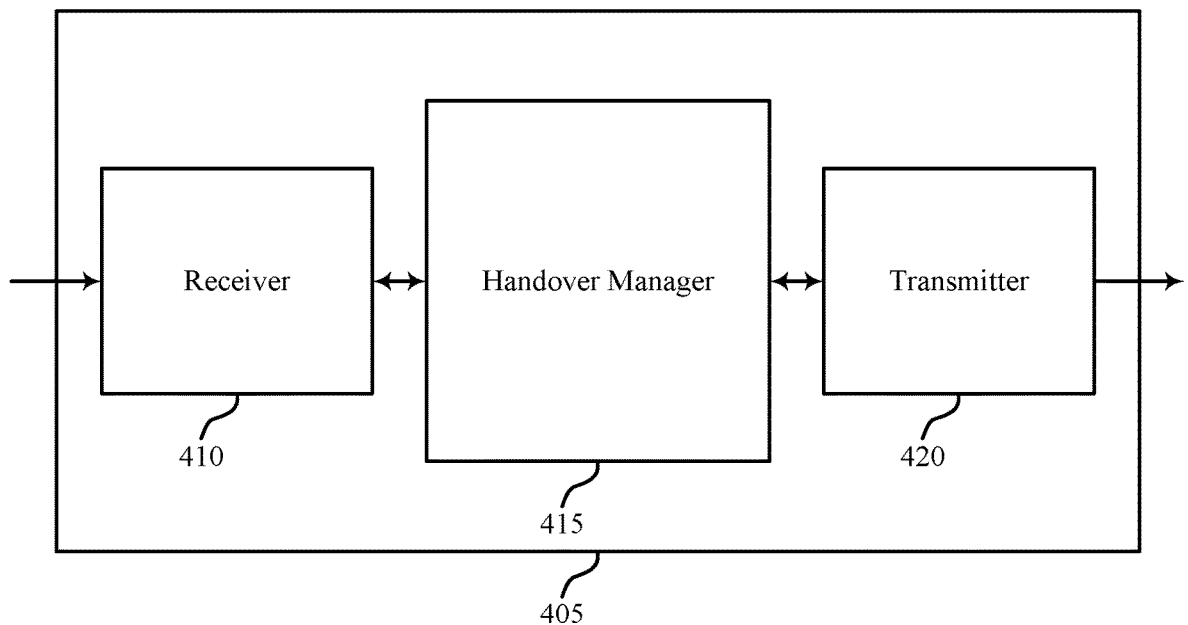
FIGS. 4-6 show a block diagrams of a wireless device that supports transmission control protocol aware handover type determination in accordance with aspects of the present disclosure.

FIG. 4 shows a block diagram 400 of a wireless device 405 that supports techniques for TCP aware handover type determination in accordance with various aspects of the present disclosure. Wireless device 405 may be an example of aspects of a UE 115 as described with reference to FIG. 1. Wireless device 405 may include receiver 410, UE handover manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to techniques for TCP aware handover type determination, etc.). Information may be passed on to other components of the device. The receiver 410 may be an example of aspects of the transceiver 735 described with reference to FIG. 7.

UE handover manager 415 may determine a capability of the UE to maintain buffered data during a handover procedure. UE handover manager 415 may perform various functions in combination with receiver 410 or transmitter 420. For example, UE handover manager 415 may transmit an indication of the capability of the UE to maintain buffered data during the handover procedure based on the determination. UE handover manager 415 may also perform a handover procedure based on transmitting the indication. UE handover manager 415 may also receive, from a serving base station, an indication whether to maintain buffered data during a handover procedure, determine whether to maintain or discard data buffered at the UE based on the received indication, and perform the handover procedure according to the received indication. UE handover manager 415 may be an example of aspects of the UE handover manager 102 described with reference to FIG. 1 and the UE handover manager 715 described with reference to FIG. 7.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
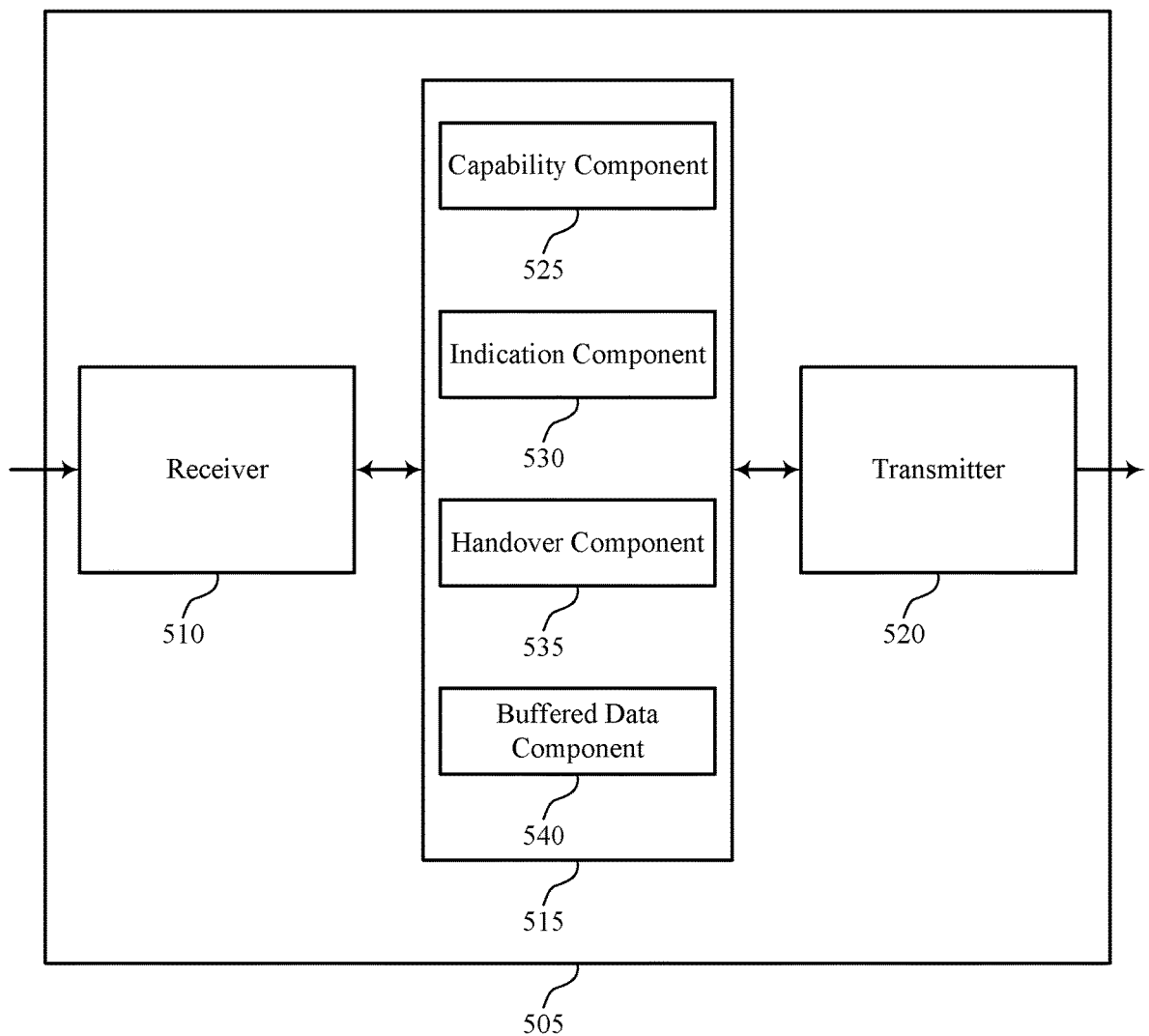

FIG. 5 shows a block diagram 500 of a wireless device 505 that supports techniques for TCP aware handover type determination in accordance with various aspects of the present disclosure. Wireless device 505 may be an example of aspects of a wireless device 405 or a UE 115 as described with reference to FIGS. 1 and 4. Wireless device 505 may include receiver 510, UE handover manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to techniques for TCP aware handover type determination, etc.). Information may be passed on to other components of the device. The receiver 510 may be an example of aspects of the transceiver 735 described with reference to FIG. 7.

UE handover manager 515 may be an example of aspects of the UE handover manager 715 described with reference to FIG. 7. UE handover manager 515 may also include capability component 525, indication component 530, handover component 535, and buffered data component 540. UE handover manager 515 may perform various functions in combination with receiver 510 or transmitter 520.

Capability component 525 may determine a capability of the UE to maintain buffered data during a handover procedure. In some cases, the buffered data includes data buffered in a PDCP buffer. In some cases, the buffered data includes data sent over the air that has not yet been received or acknowledged by an intended recipient. In some cases, the buffered data includes all data ready to send over a connection.

Indication component 530 may transmit an indication of the capability of the UE to maintain buffered data during the handover procedure based on the determination, receive an indication to maintain or discard buffered data based on transmitting the indication of the capability of the UE to maintain buffered data during the handover procedure. Indication component 530 may receive, from a serving base station, an indication whether to maintain buffered data during a handover procedure. In some cases, the received indication includes a first indication to maintain or discard buffered data for uplink and a second indication to maintain or discard buffered data for downlink. In some cases, the received indication indicates whether to maintain or discard buffered data on a per bearer basis (e.g., for individual bearers). In some cases, the transmitted indication includes a first indication of a capability of the UE to maintain buffered data for uplink and a second indication of a capability of the UE to maintain buffered data for downlink. In some cases, the indication includes a first indication of whether to maintain data buffered for downlink and a second indication of whether to maintain data buffered for uplink.

Handover component 535 may perform a handover procedure based on the received indication. In some cases, performing the handover procedure includes discarding data buffered at the UE prior to establishing a connection with a target base station. In some cases, performing the handover procedure includes transmitting buffered data to a target base station. Handover component 535 may perform the handover procedure according to the received indication.

Buffered data component 540 may determine whether to maintain or discard data buffered at the UE based on the received indication. In some cases, determining whether to discard data buffered at the UE includes delivering one or more packets of the data buffered at the UE to an upper layer or to a next hop for uplink when the indication includes an indication to discard data buffered for uplink. In some cases, determining whether to maintain or discard data buffered at the UE includes forwarding one or more packets from a PDCP buffer to an application layer of the UE (e.g., when downlink buffered data is to be discarded).

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
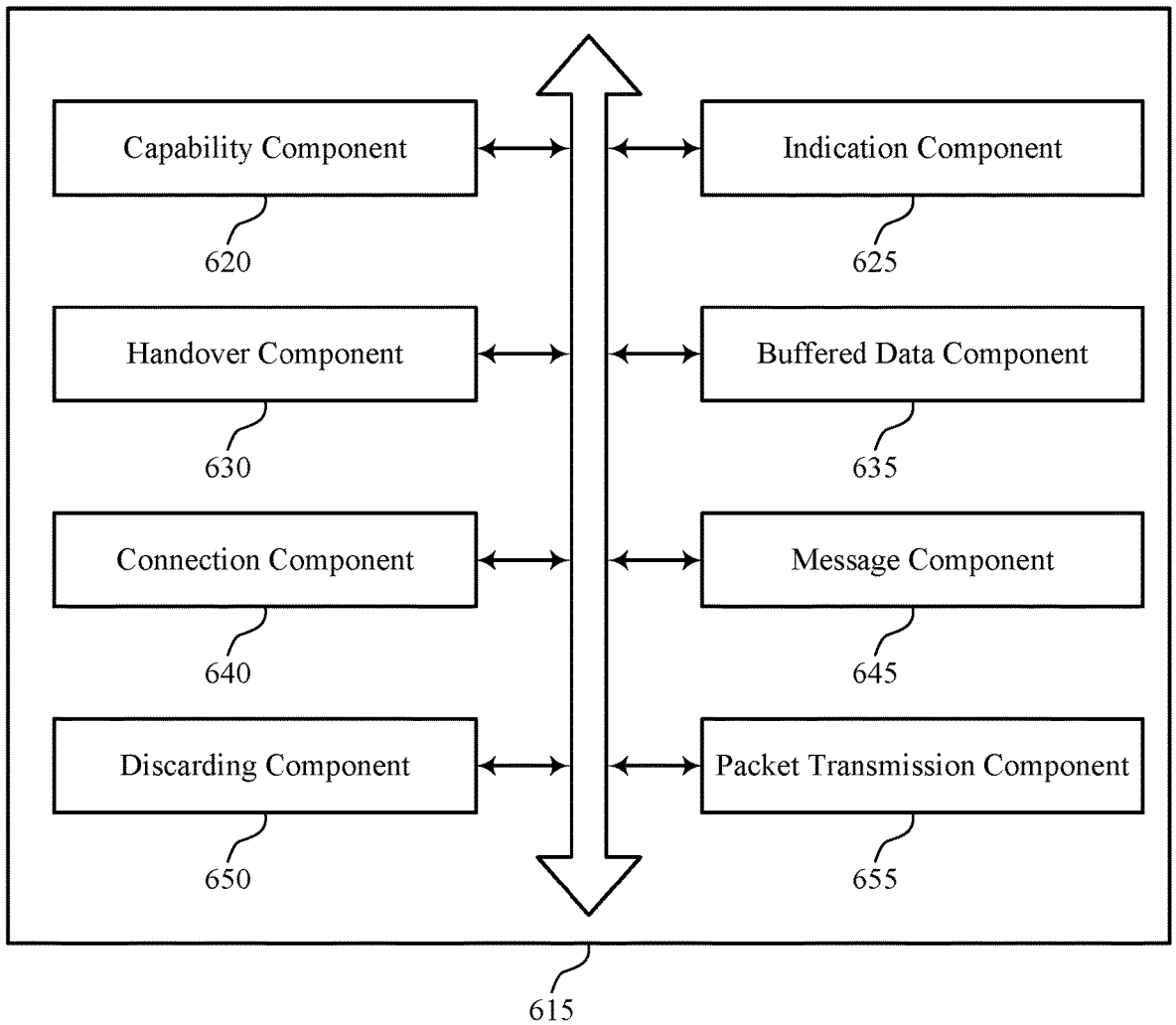

FIG. 6 shows a block diagram 600 of a UE handover manager 615 that supports techniques for TCP aware handover type determination in accordance with various aspects of the present disclosure. UE handover manager 615 may be an example of aspects of a UE handover manager 415, a UE handover manager 515, or a UE handover manager 715 described with reference to FIGS. 4, 5, and 7. UE handover manager 615 may include capability component 620, indication component 625, handover component 630, buffered data component 635, connection component 640, message component 645, discarding component 650, and packet transmission component 655. Each of these modules may communicate, directly or indirectly, with one another (e.g., via one or more buses). One or more of these modules may perform various functions in combination with a receiver or transmitter.

Capability component 620 may determine a capability of the UE to maintain buffered data during a handover procedure. In some cases, the buffered data includes data buffered in a PDCP buffer. In some cases, the buffered data includes data sent over the air that has not yet been received or acknowledged by an intended recipient. In some cases, the buffered data includes all data ready to send over a connection.

Indication component 625 may transmit an indication of the capability of the UE to maintain buffered data during the handover procedure based on the determination, receive an indication to maintain or discard buffered data based on transmitting the indication of the capability of the UE to maintain buffered data during the handover procedure, and receive, from a serving base station, an indication whether to maintain buffered data during a handover procedure. In some cases, the received indication includes a first indication to maintain or discard buffered data for uplink and a second indication to maintain or discard buffered data for downlink. In some cases, the received indication indicates whether to maintain or discard buffered data for individual bearers. In some cases, the transmitted indication includes a first indication of a capability of the UE to maintain buffered data for uplink and a second indication of a capability of the UE to maintain buffered data for downlink. In some cases, the indication includes a first indication of whether to maintain data buffered for downlink and a second indication of whether to maintain data buffered for uplink.

Handover component 630 may perform a handover procedure based on transmitting the indication. In some cases, performing the handover procedure includes discarding data buffered at the UE prior to establishing a connection with a target base station. In some examples, performing the handover includes transmitting buffered data to a target base station. Handover component 630 may perform the handover procedure according to the received indication.

Buffered data component 635 may determine whether to maintain or discard data buffered at the UE based on the received indication. In some cases, determining whether to discard data buffered at the UE includes delivering one or more packets (e.g., remaining packets of data after others have been discarded) of the data buffered at the UE to an upper layer or to a next hop for uplink when the indication includes an indication to discard data buffered for uplink. In some cases, determining whether to maintain or discard data buffered at the UE includes forwarding one or more packets from a PDCP buffer to an application layer of the UE.

Connection component 640 may establish a connection to a network via a base station serving the UE, where the indication is transmitted based on establishment of the connection. Message component 645 may receive a message from a base station serving the UE, where transmitting the indication is in response to receiving the message.

Discarding component 650 may discard data buffered at the UE. In some cases, determining whether to maintain or discard data buffered at the UE includes discarding data buffered at a PDCP buffer when the indication includes an indication to discard data buffered for uplink. Packet transmission component 655 may transmit buffered data packets. In some cases, determining whether to discard data buffered at the UE includes transmitting one or more packets of the data buffered at the UE to a target base station.

Figure 7:
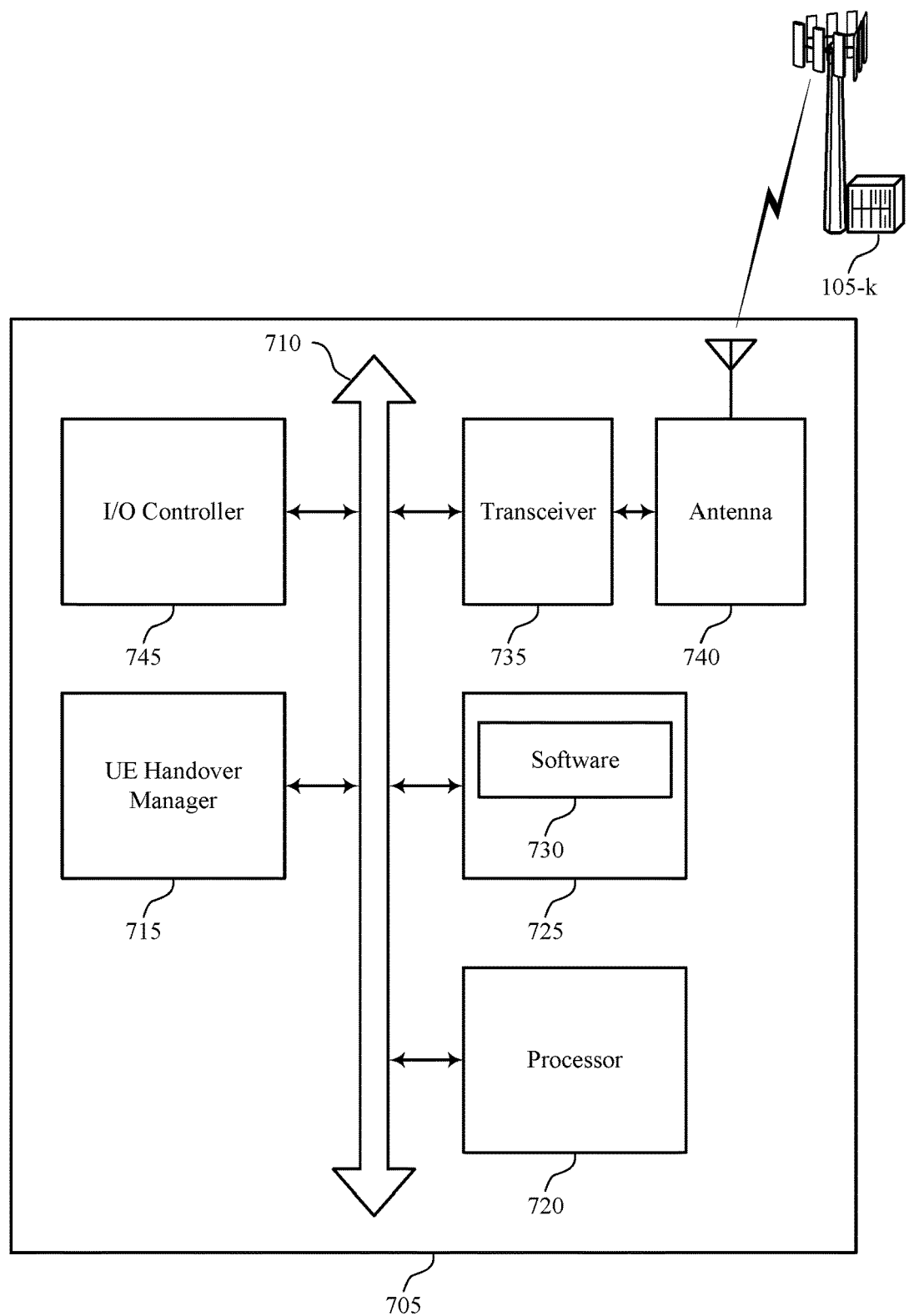
FIG. 7 shows a block diagram of a system including a UE that supports transmission control protocol aware handover type determination in accordance with aspects of the present disclosure.

FIG. 7 shows a diagram of a system 700 including a device 705 that supports techniques for TCP aware handover type determination in accordance with various aspects of the present disclosure. Device 705 may be an example of, or include the components of, wireless device 405, wireless device 505, or a UE 115 as described above, e.g., with reference to FIGS. 1, 4 and 5. Device 705 may include components for bi-directional voice and data communications including components for transmitting and receiving communications, including UE handover manager 715, processor 720, memory 725, software 730, transceiver 735, antenna 740, and I/O controller 745. These components may be in electronic communication via one or more busses (e.g., bus 710). Device 705 may communicate wirelessly with one or more base stations 105. The UE handover manager 715 may be an example of a UE handover manager 415 or 615 as described herein with reference to FIGS. 4 and 6 respectively.

Processor 720 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting techniques for TCP aware handover type determination).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a Basic Input-Output system (BIOS) which may control basic hardware and/or software operation such as the interaction with peripheral components or devices.

Software 730 may include code to implement aspects of the present disclosure, including code to support techniques for TCP aware handover type determination. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver (e.g., located at base station 105-*k*). The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system.

Figure 8:
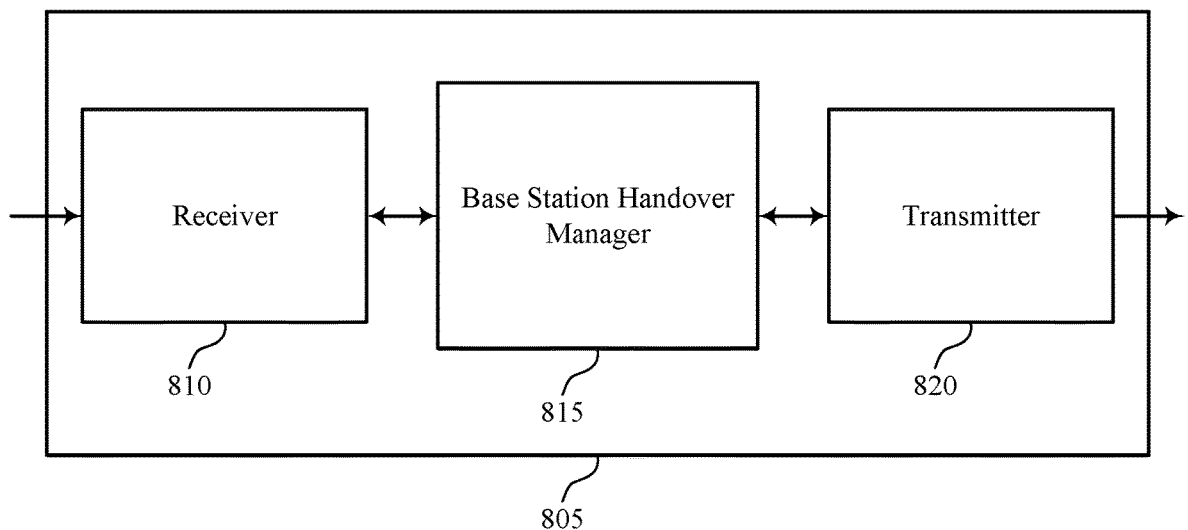
FIGS. 8-10 show block diagrams of a wireless device that supports transmission control protocol aware handover type determination in accordance with aspects of the present disclosure.

FIG. 8 shows a block diagram 800 of a wireless device 805 that supports techniques for TCP aware handover type determination in accordance with various aspects of the present disclosure. Wireless device 805 may be an example of aspects of a base station 105 as described with reference to FIG. 1. Wireless device 805 may include receiver 810, base station handover manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for TCP aware handover type determination, etc.). Information may be passed on to other components of the device. The receiver 810 may be an example of aspects of the transceiver 1135 described with reference to FIG. 11.

Base station handover manager 815 may be part of a first base station and determine that a connection is established between a UE and a network. Base station handover manager 815 may perform various functions in combination with receiver 810 or transmitter 820. For example, base station handover manager 815 may receive a connection parameter associated with a second base station associated with the network and determine whether buffered data addressed to the UE is to be maintained or discarded during a handover procedure. The determination may be based on a connection parameter associated with the first base station and the connection parameter associated with the second base station. Base station handover manager 815 may perform the handover procedure with the UE and the second base station according to the determination. In another example, base station handover manager 815 may perform a handover procedure of the UE to a target base station according to an identified handover loss metric. Base station handover manager 815 may be an example of aspects of the base station handover manager 101 described with reference to FIG. 1 and the base station handover manager 1115 described with reference to FIG. 11.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
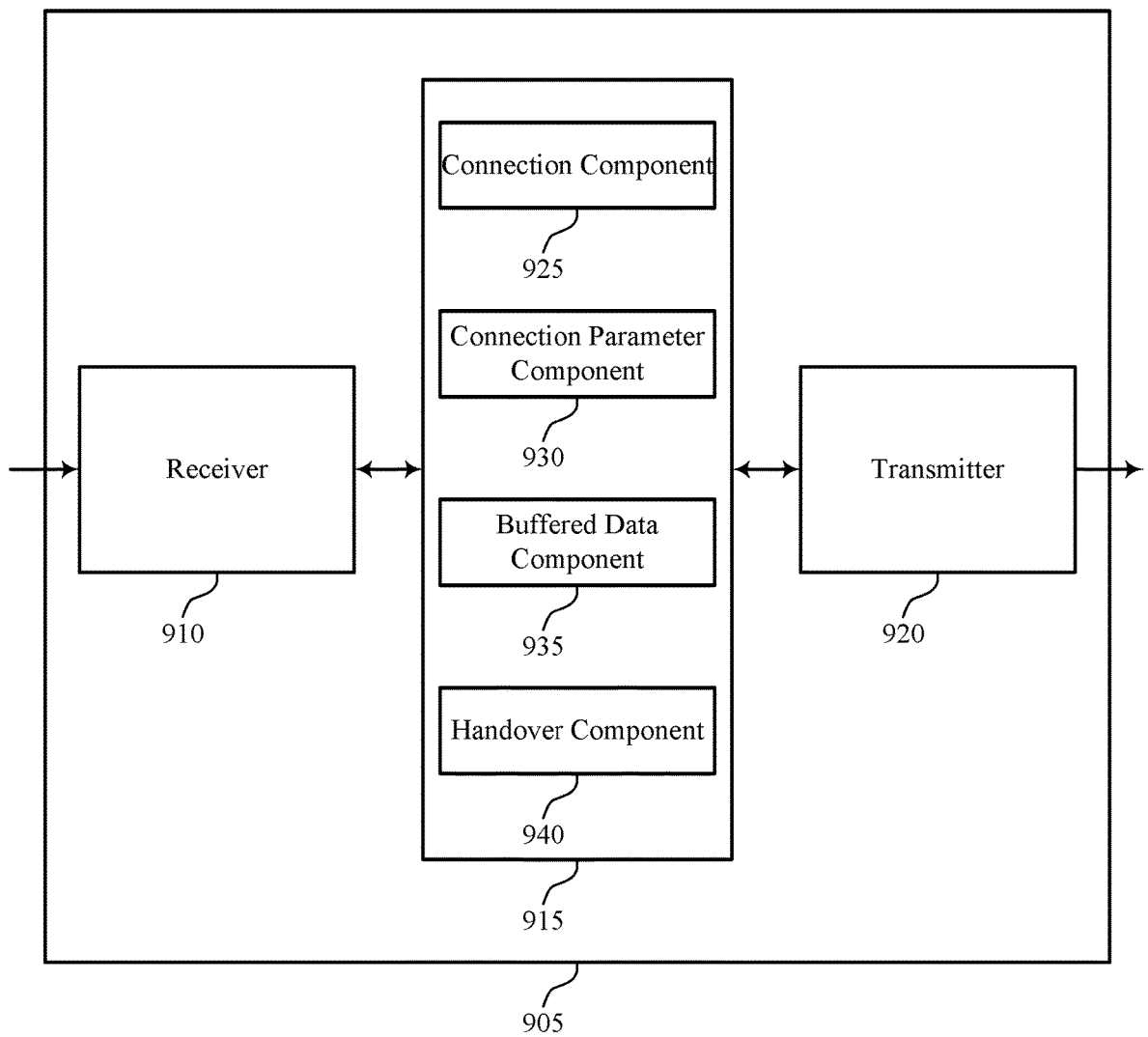

FIG. 9 shows a block diagram 900 of a wireless device 905 that supports techniques for TCP aware handover type determination in accordance with various aspects of the present disclosure. Wireless device 905 may be an example of aspects of a wireless device 805 or a base station 105 as described with reference to FIGS. 1 and 8. Wireless device 905 may include receiver 910, base station handover manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for TCP aware handover type determination, etc.). Information may be passed on to other components of the device. The receiver 910 may be an example of aspects of the transceiver 1135 described with reference to FIG. 11.

Base station handover manager 915 may be an example of aspects of the base station handover manager 1115 described with reference to FIG. 11. Base station handover manager 915 may also include connection component 925, connection parameter component 930, buffered data component 935, and handover component 940. Base station handover manager 915 may perform various functions in combination with receiver 910 or transmitter 920.

Connection component 925 may determine that a connection is established between a UE and a network and monitor the connection. The connection parameter associated with the first base station may be determined based on the monitoring. In some examples (e.g., when connection component 925 is part of a base station serving the UE), connection component 925 may monitor a throughput metric associated with a connection between a UE and the serving base station.

Connection parameter component 930 may receive a connection parameter associated with the second base station associated with the network. The connection parameter component 930 may also compute a throughput metric using the connection parameter associated with the first base station, or the connection parameter associated with the second base station, or a combination thereof. In some examples, determining whether to maintain or discard buffered data is based on the throughput metric. The connection parameter component 930 may receive the connection parameter associated with the first base station from the UE. In some cases, the connection parameter associated with the second base station may be conveyed in a non-UE-specific message received over an X2 interface between the first base station and the second base station.

In some cases, the connection parameter associated with the first base station includes at least one of an effective data rate associated with a TCP session established via the first base station, or a TCP version of a TCP session established via the first base station, or a size of TCP packets communicated over a TCP session established via the first base station, or a combination thereof. In some cases, the connection parameter associated with the first base station includes at least one of an effective data rate associated with a TCP session established via the first base station, or a TCP version of a TCP session established via the first base station, or a round trip time for an air interface between the UE and the first base station, or a round trip time for an air interface between the first base station and a TCP client device, or an estimated effective throughput metric associated with a TCP session established via the second base station, or a packet size of TCP data communicated over a TCP session established via the first base station, or a combination thereof.

In some cases, the connection parameter associated with the second base station includes at least one of an estimated effective data rate associated with a TCP session established via the second base station, an estimated round trip time for an air interface between the UE and the second base station, an estimated round trip time for an air interface between the second base station and a TCP client device, or an estimated effective throughput metric associated with a TCP session established via the second base station, or a combination thereof. In some cases, connection parameter component 930 may identify an expected throughput metric associated with a second connection between the UE and a target base station. In some cases, connection parameter component 930 may identify, based on the throughput metric and the expected throughput metric, a handover loss metric associated with a handover procedure of the UE from the serving base station to the target base station.

Buffered data component 935 may determine whether buffered data addressed to the UE is to be maintained or discarded during a handover procedure based on a connection parameter associated with the first base station and the connection parameter associated with the second base station. Buffered data component 935 may forward one or more packets of the buffered data to the second base station when the buffered data is determined to be maintained. Buffered data component 935 may discard one or more downlink packets of the buffered data when the buffered data is determined to be discarded, and deliver one or more packets of buffered data received from the UE to an upper layer or to a next hop for when the buffered data is determined to be discarded.

Handover component 940 may perform the handover procedure with the UE and the second base station according to the handover type determination. In some examples, handover component 940 may determine that the handover loss metric comprises a lossy handover metric. In some examples, the handover component 940 may perform the handover procedure of the UE to the target base station according to the identified handover loss metric.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
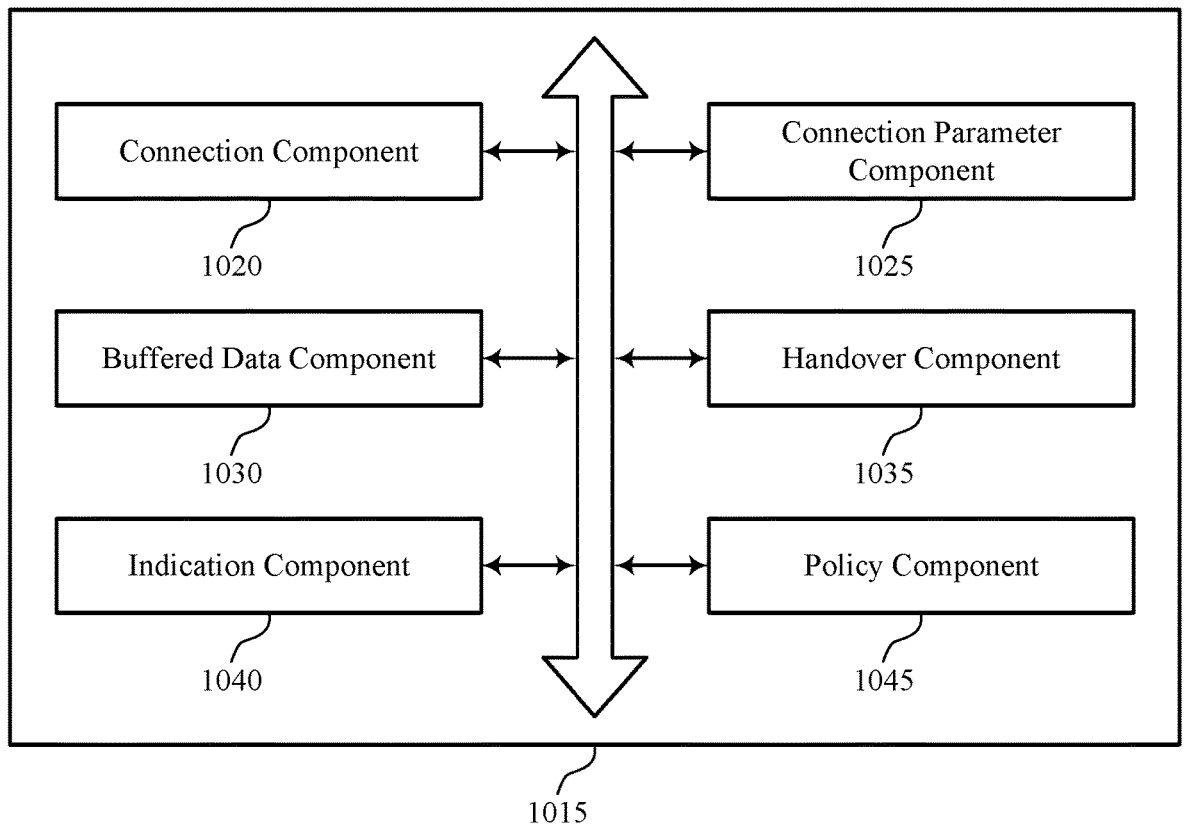

FIG. 10 shows a block diagram 1000 of a base station handover manager 1015 that supports techniques for TCP aware handover type determination in accordance with various aspects of the present disclosure. The base station handover manager 1015 may be an example of aspects of a base station handover manager 1115 described with reference to FIGS. 8, 9, and 11. The base station handover manager 1015 may include connection component 1020, connection parameter component 1025, buffered data component 1030, handover component 1035, indication component 1040, and policy component 1045. Each of these modules may communicate, directly or indirectly, with one another (e.g., via one or more buses). One or more of these modules may perform various functions in combination with a receiver or a transmitter.

Connection component 1020 may be part of a first base station and may determine that a connection is established between a UE and a network and monitor the connection. The connection parameter associated with the first base station may be determined based on the monitoring. In some examples, connection component 1020 may receive, at a target base station, a handover request message from a serving base station Connection parameter component 1025 may receive a connection parameter associated with the second base station associated with the network. Connection parameter component 1025 may compute a throughput metric using the connection parameter associated with the first base station, or the connection parameter associated with the second base station, or a combination thereof. Determining whether to maintain or discard buffered data may be based on the throughput metric. In some cases, connection parameter component 1025 may receive the connection parameter associated with the first base station from the UE. In some examples (e.g., when connection parameter component 1025 is part of a serving base station), connection parameter component 1025 may monitor a throughput metric associated with a first connection between a UE and the serving base station. In some examples (e.g., when connection parameter component 1025 is part of a target base station), connection parameter component 1025 may transmit a connection parameter to the serving base station, the connection parameter associated with a connection between a target base station and the UE. In some cases, the connection parameter includes information associated with an effective throughput rate associated with a TCP session established via the target base station In some cases, the connection parameter associated with the first base station includes at least one of an effective data rate associated with a TCP session established via the first base station, or a TCP version of a TCP session established via the first base station, or a size of TCP packets communicated over a TCP session established via the first base station, or a combination thereof. In some cases, the connection parameter associated with the first base station includes at least one of a round trip time for an air interface between the UE and the first base station, or a round trip time for an air interface between the first base station and a TCP client device, or an estimated effective throughput metric associated with a TCP session established via the second base station, or a combination thereof. In some cases (e.g., when connection parameter component 1025 is part of a target base station), connection parameter component 1025 may receive a handover procedure message from the serving base station. The handover procedure message may include an indication of a handover loss metric, the handover loss metric based on the connection parameter.

In some cases, the connection parameter associated with the second base station includes at least one of estimated effective data rate associated with a TCP session established via the second base station, or an estimated round trip time for an air interface between the UE and the second base station, or an estimated round trip time for an air interface between the second base station and a TCP client device, or an estimated effective throughput metric associated with a TCP session established via the second base station, or a combination thereof. In some cases, the connection parameter associated with the second base station is conveyed in a non-UE-specific message received over an X2 interface between the first base station and the second base station. In some examples, connection parameter component 1025 may identify an expected throughput metric associated with a second connection between the UE and a target base station. In some examples, connection parameter component 1025 may identify, based on the throughput metric and the expected throughput metric, a handover loss metric associated with a handover procedure of the UE from the serving base station to the target base station.

Buffered data component 1030 may determine whether buffered data addressed to the UE is to be maintained or discarded during a handover procedure based on a connection parameter associated with the first base station and the connection parameter associated with the second base station. Buffered data component 1030 may (e.g., when buffered data component 1030 is part of the first base station) forward one or more packets of buffered data to the second base station when the buffered data is determined to be maintained. Buffered data component 1030 may discard one or more downlink packets of the buffered data when the buffered data is determined to be discarded, and may deliver one or more packets of buffered data received from the UE to an upper layer or to a next hop for when the buffered data is determined to be discarded. In some examples (e.g., when one or more buffered packets are addressed to the UE), buffered data component 1030 may refrain from forwarding the one or more buffered packets to the target base station. In some examples, buffered data component 1030 may determine that the handover loss metric comprises a lossless handover metric. In some examples (e.g., when one or more buffered packets are addressed to the UE), buffered data component 1030 may forward the one or more buffered packets to the target base station.

Handover component 1035 may, when part of the first base station, perform the handover procedure with the UE and the second base station according to the determination. Indication component 1040 may transmit an indication of whether the buffered data is to be maintained or discarded to the second base station and transmit an indication of the throughput metric to the second base station. In some cases, the indication may be transmitted in a handover request or a handover acknowledgement. In some examples, the handover component 1035 may perform the handover procedure of the UE to the target base station according to the identified handover loss metric. In some examples, the handover component 1035 may perform the handover procedure of the UE to the target base station according to the identified handover loss metric. In some examples, handover component 1035 may perform a handover procedure of the UE to the target base station according to the handover loss metric.

Policy component 1045 may determine whether to maintain or discard buffered data based on a policy at the first base station. The policy may be determined based on, or include, a connection parameter associated with the first base station and the connection parameter associated with the second base station. In some cases, the policy may be based on, or include, combinations of communication link types. In some cases, the policy may be based on, or include, at least one of a type of communication link associated with the first base station, or a type of communication link associated with the second base station, or a loading of the first base station, or a loading of the second base station, or a TCP version of a TCP session established via the first base station, or a packet size of TCP data communicated over a TCP session established via the first base station, or a throughput of a TCP session established via the first base station, or a throughput of a communication link associated with the second base station and the UE, or an estimated round trip time of a communication link associated with the UE and the second based station, or a combination thereof.

Figure 11:
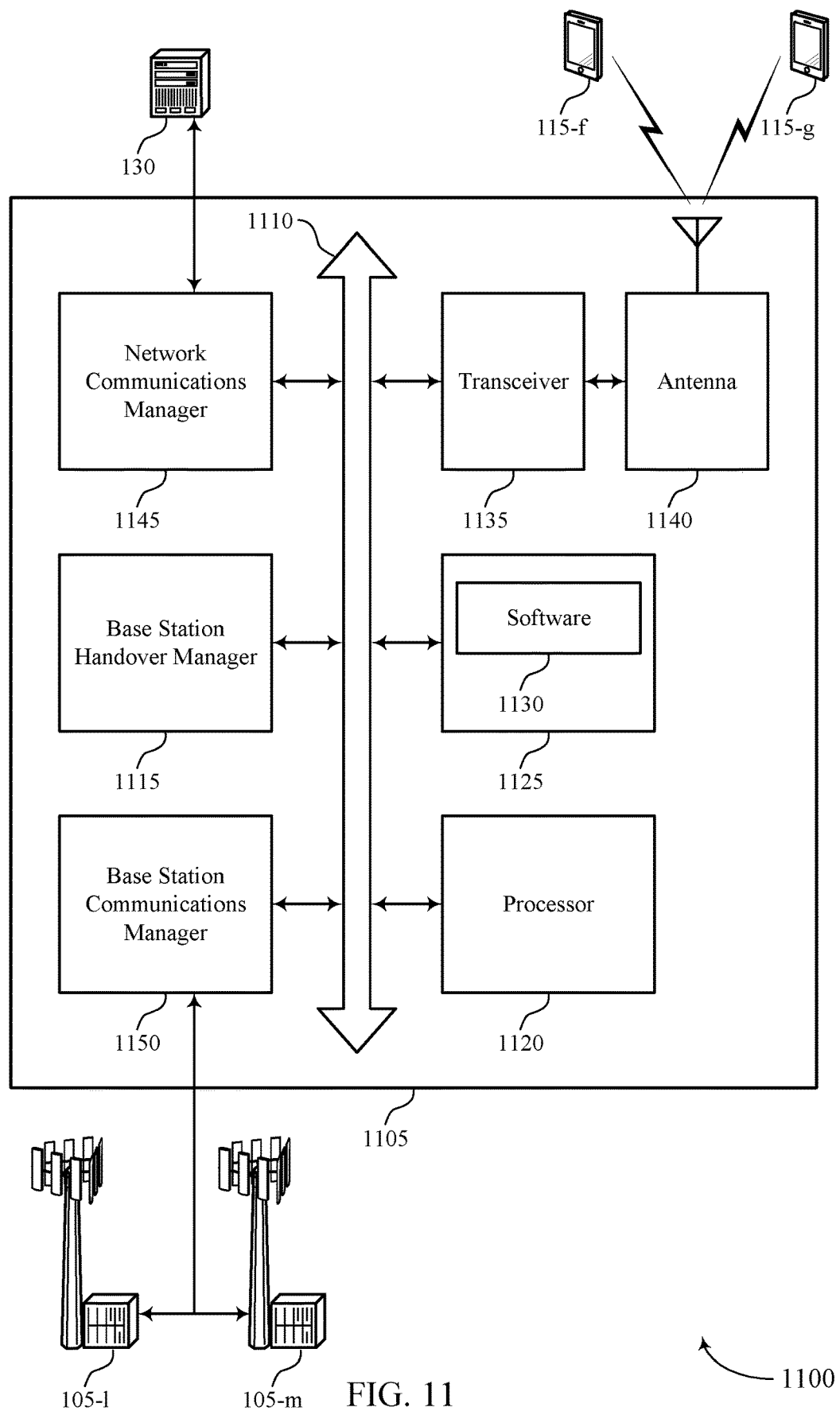
FIG. 11 illustrates a block diagram of a system including a base station that supports transmission control protocol aware handover type determination in accordance with aspects of the present disclosure.

FIG. 11 shows a diagram of a system 1100 including a device 1105 that supports techniques for TCP aware handover type determination in accordance with various aspects of the present disclosure. Device 1105 may be an example of or include the components of base station 105 as described above, e.g., with reference to FIG. 1. Device 1105 may include components for bi-directional voice and data communications including components for transmitting and receiving communications, including base station handover manager 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for TCP aware handover type determination).

Memory 1125 may include RAM and read only memory ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support techniques for TCP aware handover type determination. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver (e.g., located at UE 115-*f* or UE 115-*g*). The transceiver 1135 may also include a modem to modulate the packets and provide the modulated packets to the antennas for transmission, and to demodulate packets received from the antennas. In some cases, the device 1105 may include a single antenna 1140. However, in some cases the device 1105 may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may communicate with core network 130 and may manage the transfer of data communications for client devices, such as one or more UEs 115. Base station communications manager 1150 may manage communications with other base station 105, and may include a controller or scheduler for controlling communications with UEs 115 in cooperation with other base stations 105 (e.g., base station 105-1 and/or base station 105-*m*). For example, the base station communications manager 1150 may coordinate scheduling for transmissions to UEs 115 for various interference mitigation techniques such as beamforming or joint transmission. In some examples, base station communications manager 1150 may provide an X2 interface within an LTE/LTE-A wireless communication network technology to provide communication between base stations 105.

Figure 12:
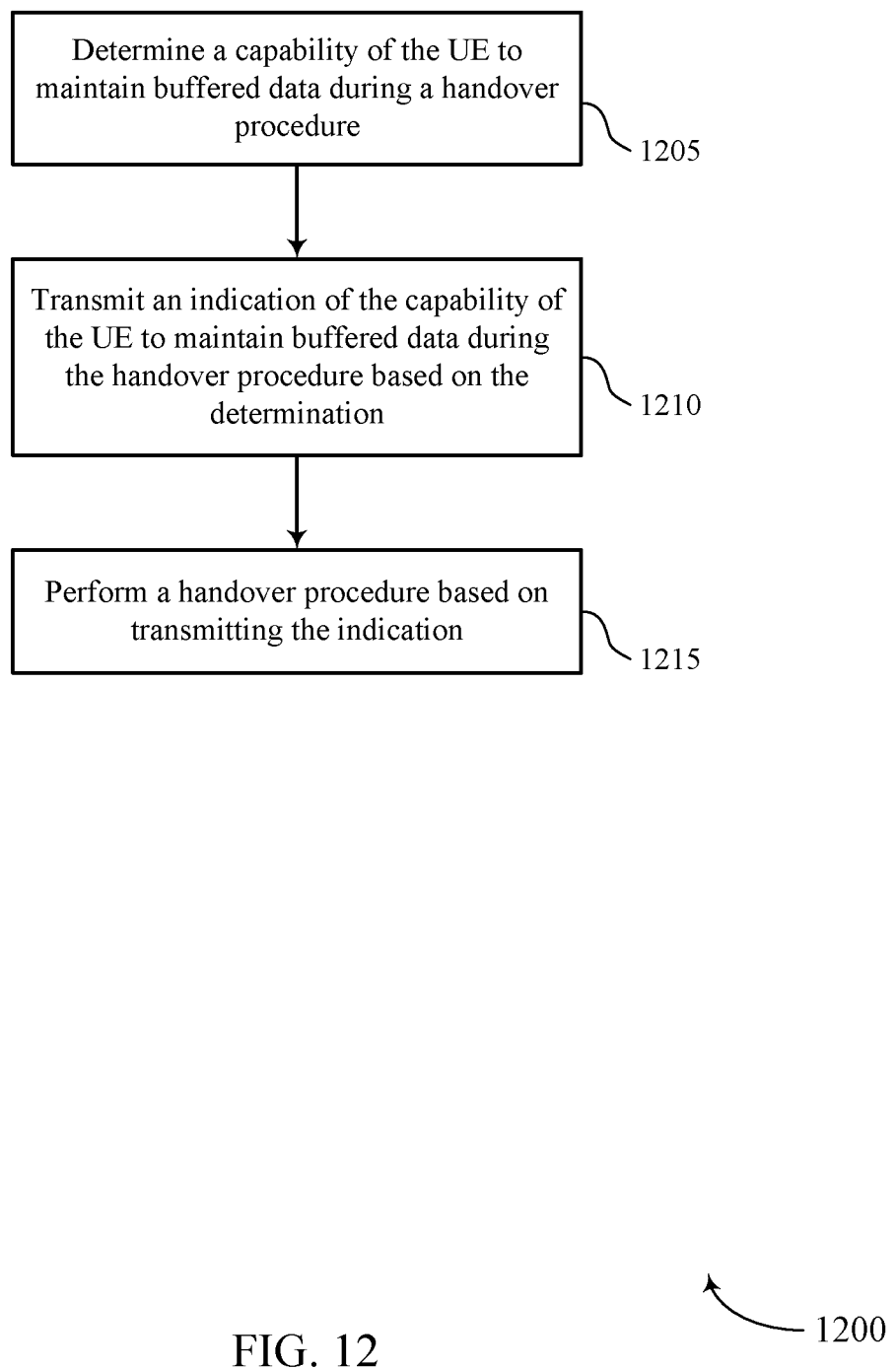
FIGS. 12 through 21 illustrate methods for transmission control protocol aware handover type determination in accordance with aspects of the present disclosure.

FIG. 12 shows a flowchart illustrating a method 1200 for techniques for TCP aware handover type determination in accordance with various aspects of the present disclosure. The operations of method 1200 may be implemented by a UE or its components as described herein. For example, the operations of method 1200 may be performed by a UE handover manager as described with reference to FIGS. 4 through 7. In some examples, a UE may execute a set of codes to control the functional elements of the device to perform the functions described below. Additionally or alternatively, the UE may perform aspects the functions described below using special-purpose hardware.

At block 1205 the UE may determine a capability of the UE to maintain buffered data during a handover procedure. The operations of block 1205 may be performed according to the methods described with reference to FIGS. 1 through 3D. In certain examples, aspects of the operations of block 1205 may be performed by a capability component as described with reference to FIGS. 4 through 7. At block 1210 the UE may transmit an indication of the capability of the UE to maintain buffered data during the handover procedure based at least in part on the determination. The operations of block 1210 may be performed according to the methods described with reference to FIGS. 1 through 3D. In certain examples, aspects of the operations of block 1210 may be performed by an indication component as described with reference to FIGS. 4 through 7. At block 1215 the UE may perform a handover procedure based at least in part on transmitting the indication. The operations of block 1215 may be performed according to the methods described with reference to FIGS. 1 through 3D. In certain examples, aspects of the operations of block 1215 may be performed by a handover component as described with reference to FIGS. 4 through 7.

Figure 13:
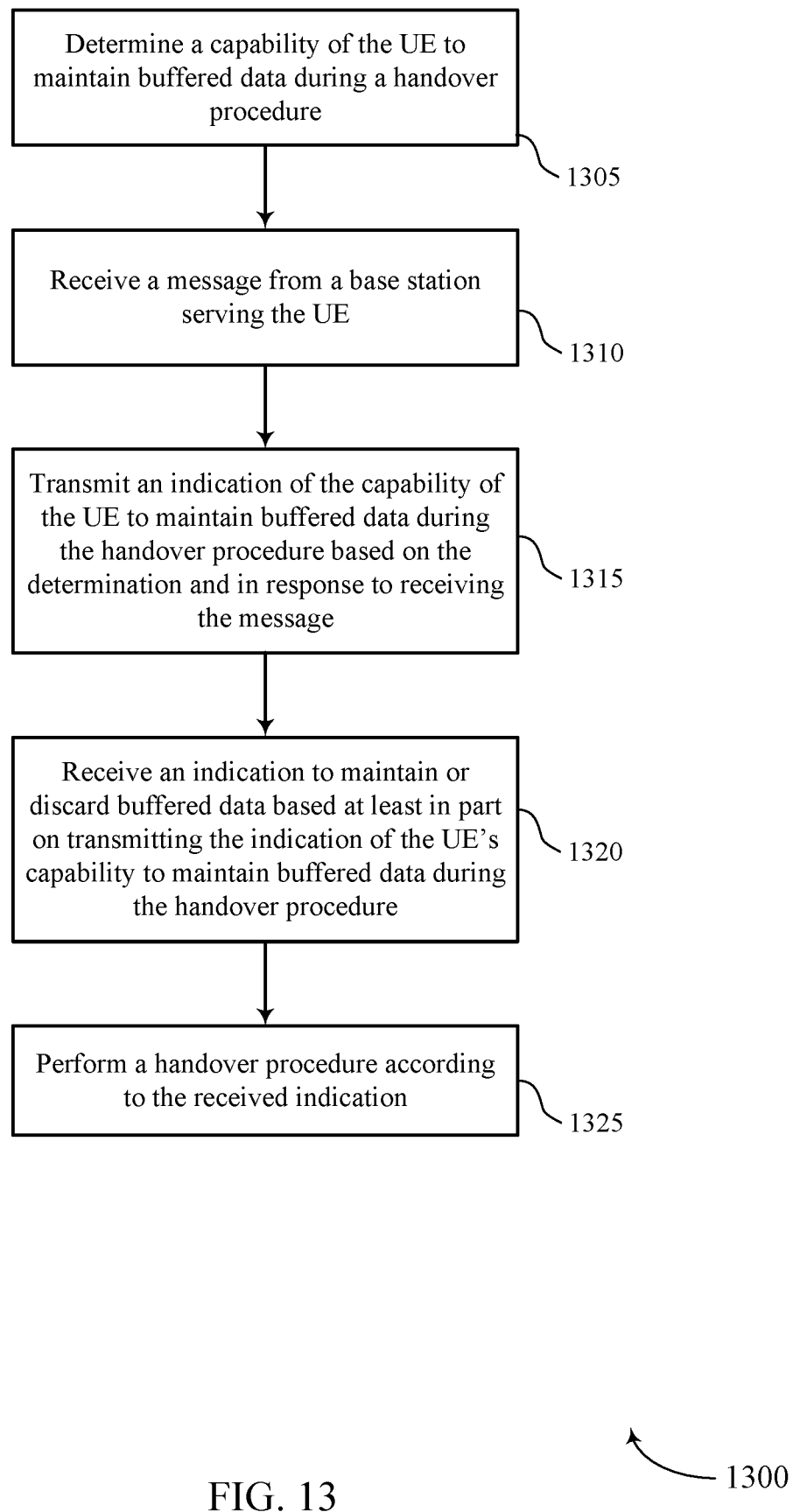

FIG. 13 shows a flowchart illustrating a method 1300 for techniques for TCP aware handover type determination in accordance with various aspects of the present disclosure. The operations of method 1300 may be implemented by a UE or its components as described herein. For example, the operations of method 1300 may be performed by a UE handover manager as described with reference to FIGS. 4 through 7. In some examples, a UE may execute a set of codes to control the functional elements of the device to perform the functions described below. Additionally or alternatively, the UE may perform aspects the functions described below using special-purpose hardware.

At block 1305 the UE may determine a capability of the UE to maintain buffered data during a handover procedure. The operations of block 1305 may be performed according to the methods described with reference to FIGS. 1 through 3D. In certain examples, aspects of the operations of block 1305 may be performed by a capability component as described with reference to FIGS. 4 through 7. At block 1310 the UE may receive a message from a base station serving the UE. The operations of block 1310 may be performed according to the methods described with reference to FIGS. 1 through 3D. In certain examples, aspects of the operations of block 1310 may be performed by a message component as described with reference to FIGS. 4 through 7.

At block 1315 the UE may transmit an indication of the capability of the UE to maintain buffered data during the handover procedure based at least in part on the determination and in response to the message received from the serving base station. The operations of block 1315 may be performed according to the methods described with reference to FIGS. 1 through 3D. In certain examples, aspects of the operations of block 1315 may be performed by an indication component as described with reference to FIGS. 4 through 7. At block 1320 the UE receive an indication to maintain or discard buffered data based at least in part on transmitting the indication of the capability of the UE to maintain buffered data during the handover procedure. The operations of block 1320 may be performed according to the methods described with reference to FIGS. 1 through 3D. In certain examples, aspects of the operations of block 1320 may be performed by an indication component as described with reference to FIGS. 4 through 7.

At block 1325 the UE may perform a handover procedure according to the received indication. The operations of block 1325 may be performed according to the methods described with reference to FIGS. 1 through 3D. In certain examples, aspects of the operations of block 1325 may be performed by a handover component as described with reference to FIGS. 4 through 7.

Figure 14:
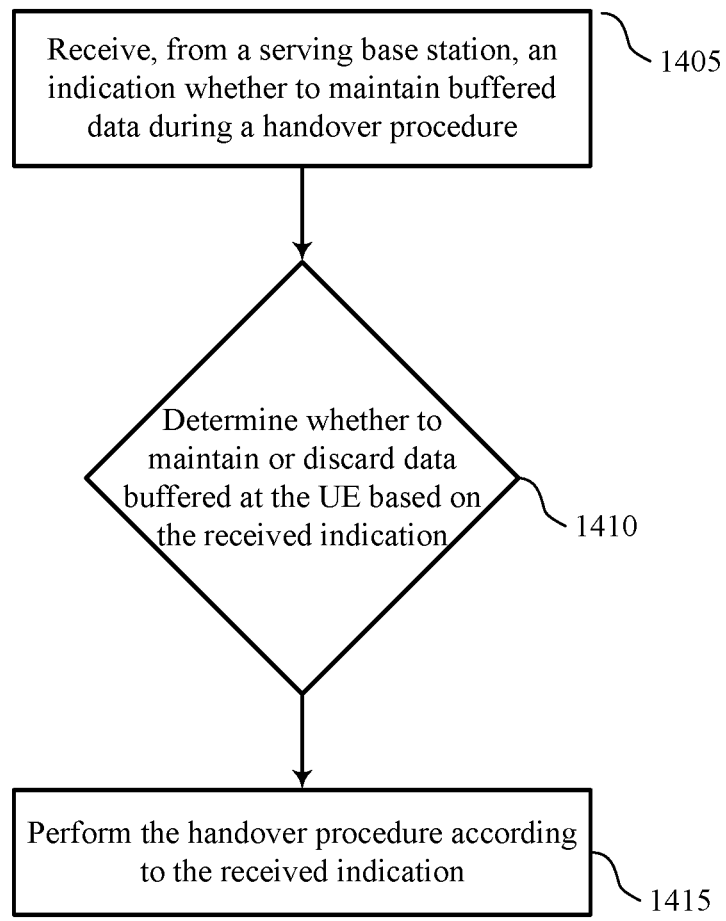

FIG. 14 shows a flowchart illustrating a method 1400 for techniques for TCP aware handover type determination in accordance with various aspects of the present disclosure. The operations of method 1400 may be implemented by a UE or its components as described herein. For example, the operations of method 1400 may be performed by a UE handover manager as described with reference to FIGS. 4 through 7. In some examples, a UE may execute a set of codes to control the functional elements of the device to perform the functions described below. Additionally or alternatively, the UE may perform aspects the functions described below using special-purpose hardware.

At block 1405 the UE may receive, from a serving base station, an indication whether to maintain buffered data during a handover procedure. The operations of block 1405 may be performed according to the methods described with reference to FIGS. 1 through 3D. In certain examples, aspects of the operations of block 1405 may be performed by an indication component as described with reference to FIGS. 4 through 7.

At block 1410 the UE may determine whether to maintain or discard data buffered at the UE based at least in part on the received indication. The operations of block 1410 may be performed according to the methods described with reference to FIGS. 1 through 3D. In certain examples, aspects of the operations of block 1410 may be performed by a buffered data component as described with reference to FIGS. 4 through 7.

At block 1415 the UE may perform the handover procedure according to the received indication. The operations of block 1415 may be performed according to the methods described with reference to FIGS. 1 through 3D. In certain examples, aspects of the operations of block 1415 may be performed by a handover component as described with reference to FIGS. 4 through 7.

Figure 15:
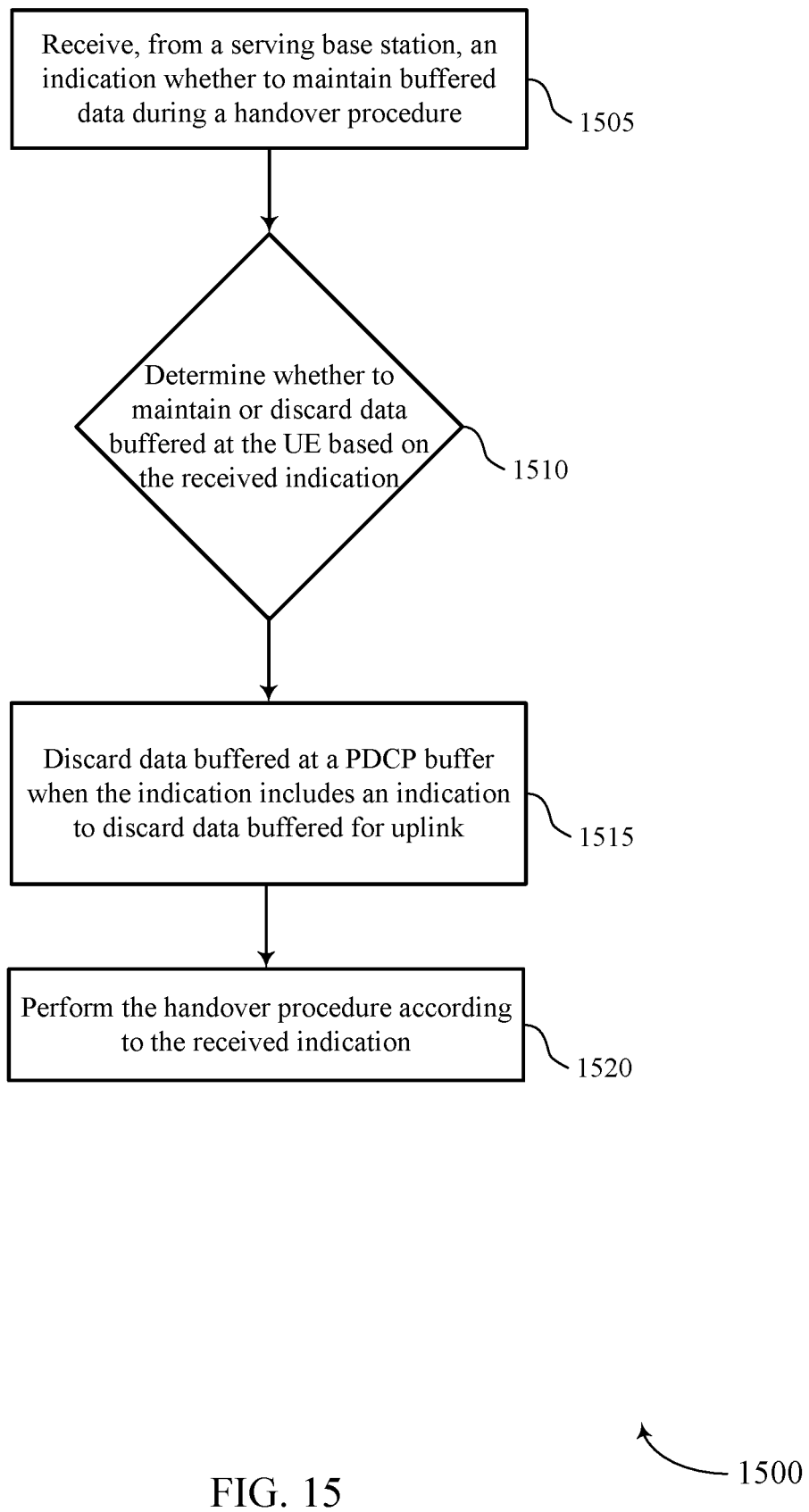

FIG. 15 shows a flowchart illustrating a method 1500 for techniques for TCP aware handover type determination in accordance with various aspects of the present disclosure. The operations of method 1500 may be implemented by a UE or its components as described herein. For example, the operations of method 1500 may be performed by a UE handover manager as described with reference to FIGS. 4 through 7. In some examples, a UE may execute a set of codes to control the functional elements of the device to perform the functions described below. Additionally or alternatively, the UE may perform aspects the functions described below using special-purpose hardware.

At block 1505 the UE may receive, from a serving base station, an indication whether to maintain buffered data during a handover procedure. The operations of block 1505 may be performed according to the methods described with reference to FIGS. 1 through 3D. In certain examples, aspects of the operations of block 1505 may be performed by an indication component as described with reference to FIGS. 4 through 7. At block 1510 the UE may determine whether to maintain or discard data buffered at the UE based at least in part on the received indication. The operations of block 1510 may be performed according to the methods described with reference to FIGS. 1 through 3D. In certain examples, aspects of the operations of block 1510 may be performed by a buffered data component as described with reference to FIGS. 4 through 7.

At block 1515 the UE may discard data buffered at a PDCP buffer when the indication comprises an indication to discard data buffered for uplink. The operations of block 1515 may be performed according to the methods described with reference to FIGS. 1 through 3D. In certain examples, aspects of the operations of block 1515 may be performed by a discarding component as described with reference to FIGS. 4 through 7. At block 1520 the UE may perform the handover procedure according to the received indication. The operations of block 1520 may be performed according to the methods described with reference to FIGS. 1 through 3D. In certain examples, aspects of the operations of block 1520 may be performed by a handover component as described with reference to FIGS. 4 through 7.

Figure 16:
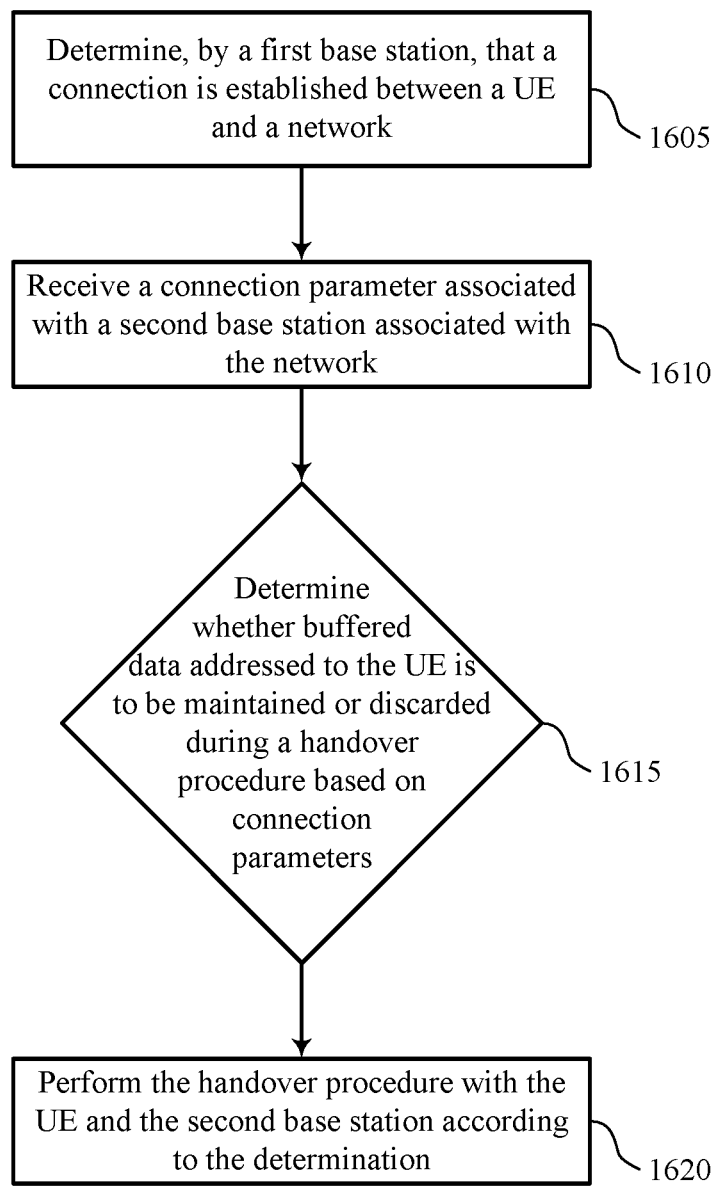

FIG. 16 shows a flowchart illustrating a method 1600 for techniques for TCP aware handover type determination in accordance with various aspects of the present disclosure. The operations of method 1600 may be implemented by a base station or its components as described herein. For example, the operations of method 1600 may be performed by a base station handover manager as described with reference to FIGS. 8 through 11. In some examples, a base station may execute a set of codes to control the functional elements of the device to perform the functions described below. Additionally or alternatively, the base station may perform aspects the functions described below using special-purpose hardware.

At block 1605 a first base station may determine that a connection is established between a UE and a network. The operations of block 1605 may be performed according to the methods described with reference to FIGS. 1 through 3D. In certain examples, aspects of the operations of block 1605 may be performed by a connection component as described with reference to FIGS. 8 through 11. At block 1610 the first base station may receive a connection parameter associated with a second base station associated with the network. The operations of block 1610 may be performed according to the methods described with reference to FIGS. 1 through 3D. In certain examples, aspects of the operations of block 1610 may be performed by a connection parameter component as described with reference to FIGS. 8 through 11.

At block 1615 the first base station may determine whether buffered data addressed to the UE is to be maintained or discarded during a handover procedure based at least in part on a connection parameter associated with the first base station and the connection parameter associated with the second base station. The operations of block 1615 may be performed according to the methods described with reference to FIGS. 1 through 3D. In certain examples, aspects of the operations of block 1615 may be performed by a buffered data component as described with reference to FIGS. 8 through 11. At block 1620 the first base station may perform the handover procedure with the UE and the second base station according to the determination. The operations of block 1620 may be performed according to the methods described with reference to FIGS. 1 through 3D. In certain examples, aspects of the operations of block 1620 may be performed by a handover component as described with reference to FIGS. 8 through 11.

Figure 17:
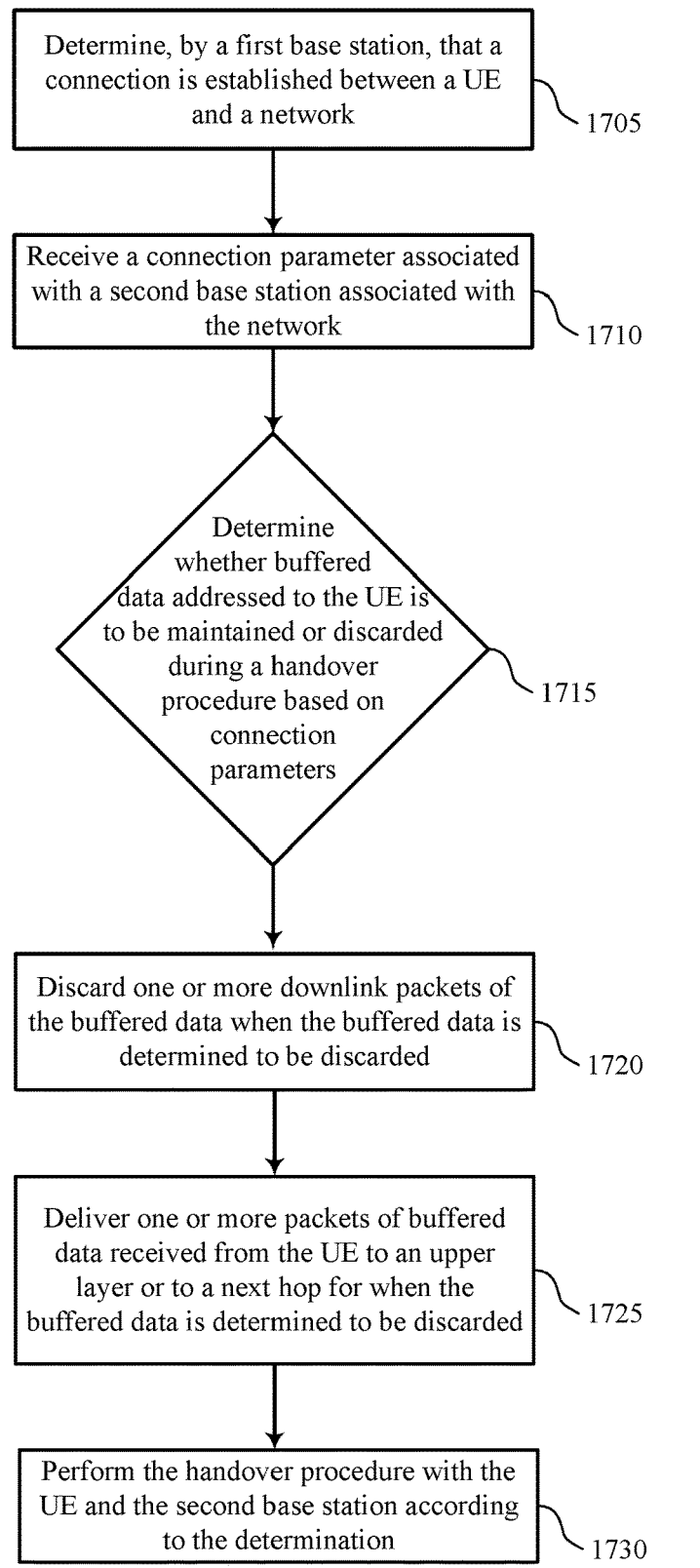

FIG. 17 shows a flowchart illustrating a method 1700 for techniques for TCP aware handover type determination in accordance with various aspects of the present disclosure. The operations of method 1700 may be implemented by a base station or its components as described herein. For example, the operations of method 1700 may be performed by a base station handover manager as described with reference to FIGS. 8 through 11. In some examples, a base station may execute a set of codes to control the functional elements of the device to perform the functions described below. Additionally or alternatively, the base station may perform aspects the functions described below using special-purpose hardware.

At block 1705 a first base station may determine that a connection is established between a UE and a network. The operations of block 1705 may be performed according to the methods described with reference to FIGS. 1 through 3D. In certain examples, aspects of the operations of block 1705 may be performed by a connection component as described with reference to FIGS. 8 through 11. At block 1710 the first base station may receive a connection parameter associated with a second base station associated with the network. The operations of block 1710 may be performed according to the methods described with reference to FIGS. 1 through 3D. In certain examples, aspects of the operations of block 1710 may be performed by a connection parameter component as described with reference to FIGS. 8 through 11.

At block 1715 the first base station may determine whether buffered data addressed to the UE is to be maintained or discarded during a handover procedure based at least in part on a connection parameter associated with the first base station and the connection parameter associated with the second base station. The operations of block 1715 may be performed according to the methods described with reference to FIGS. 1 through 3D. In certain examples, aspects of the operations of block 1715 may be performed by a buffered data component as described with reference to FIGS. 8 through 11.

At block 1720 the first base station may discard one or more downlink packets of the buffered data when the buffered data is determined to be discarded. The operations of block 1720 may be performed according to the methods described with reference to FIGS. 1 through 3D. In certain examples, aspects of the operations of block 1720 may be performed by a buffered data component as described with reference to FIGS. 8 through 11. At block 1725 the first base station may deliver one or more packets of buffered data received from the UE to an upper layer or to a next hop for when the buffered data is determined to be discarded. The operations of block 1725 may be performed according to the methods described with reference to FIGS. 1 through 3D. In certain examples, aspects of the operations of block 1725 may be performed by a buffered data component as described with reference to FIGS. 8 through 11.

At block 1730 the first base station may perform the handover procedure with the UE and the second base station according to the determination. The operations of block 1730 may be performed according to the methods described with reference to FIGS. 1 through 3D. In certain examples, aspects of the operations of block 1730 may be performed by a handover component as described with reference to FIGS. 8 through 11.

Figure 18:
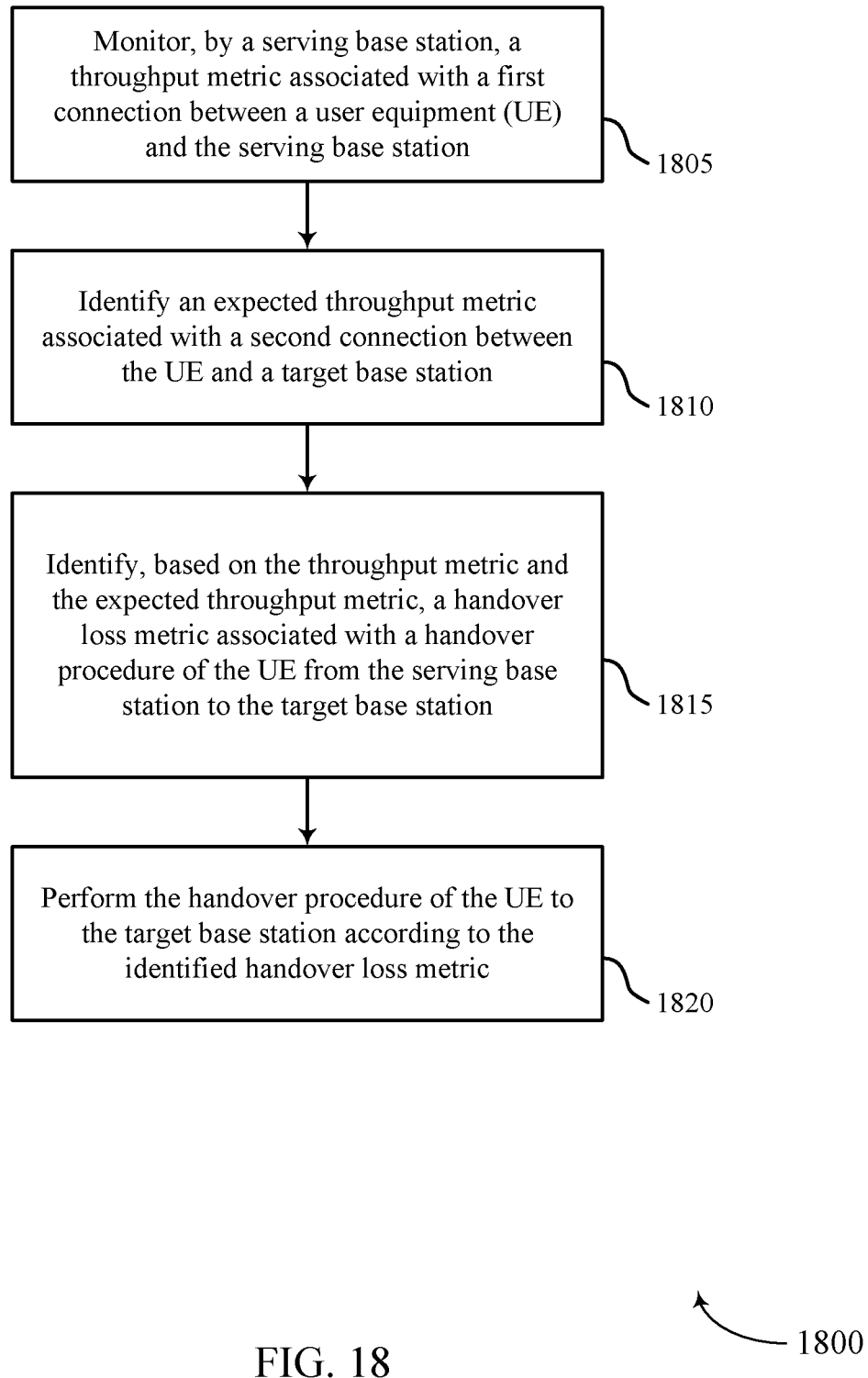

FIG. 18 shows a flowchart illustrating a method 1800 for transmission control protocol aware handover type determination in accordance with various aspects of the present disclosure. The operations of method 1800 may be implemented by a device such as a base station or its components as described with reference to FIGS. 1 through 3D. For example, the operations of method 1800 may be performed by the base station handover manager as described herein. In some examples, the base station may execute a set of codes to control the functional elements of the device to perform the functions described below. Additionally or alternatively, the base station may perform aspects the functions described below using special-purpose hardware.

At block 1805, a serving base station may monitor a throughput metric associated with a first connection between a UE and the serving base station as described above with reference to FIGS. 2 through 3D. In certain examples, the operations of block 1805 may be performed by a connection component as described with reference to FIGS. 8 through 11. At block 1810, the serving base station may identify an expected throughput metric associated with a second connection between the UE and a target base station as described above with reference to FIGS. 1 through 3D. In certain examples, the operations of block 1810 may be performed by a connection component as described with reference to FIGS. 8 through 11.

At block 1815, the serving base station may identify, based on the throughput metric and the expected throughput metric, a handover loss metric associated with a handover procedure of the UE from the serving base station to the target base station as described above with reference to FIGS. 1 through 3D. In certain examples, the operations of block 1815 may be performed by a buffered data component as described with reference to FIGS. 8 through 11. At block 1820, the serving base station may perform the handover procedure of the UE to the target base station according to the identified handover loss metric as described above with reference to FIGS. 1 through 3D. In certain examples, the operations of block 1820 may be performed be performed by a handover component as described with reference to FIGS. 8 through 11.

Figure 19:
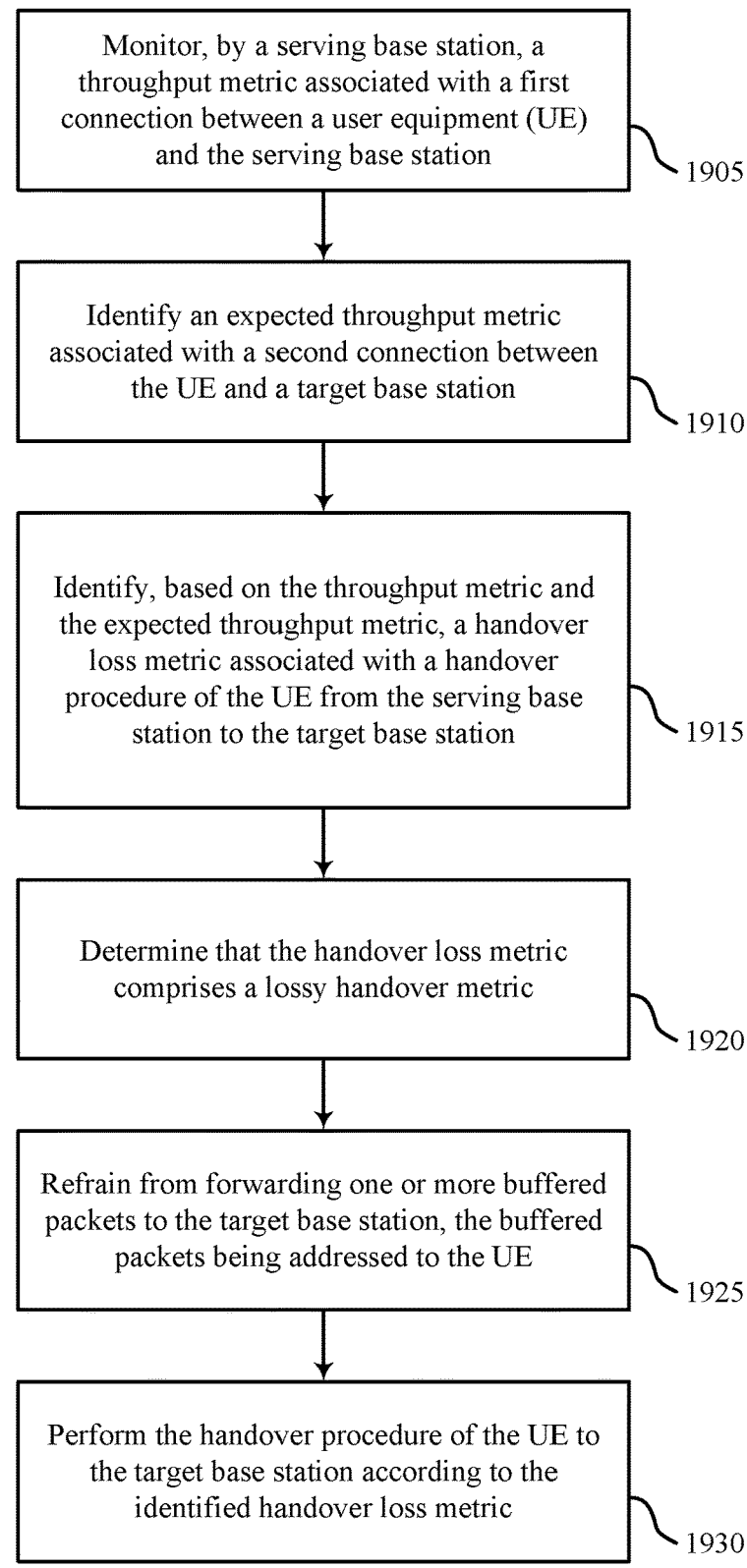

FIG. 19 shows a flowchart illustrating a method 1900 for transmission control protocol aware handover type determination in accordance with various aspects of the present disclosure. The operations of method 1900 may be implemented by a device such as a base station or its components as described with reference to FIGS. 1 through 3D. For example, the operations of method 1900 may be performed by a base station handover manager as described with reference to FIGS. 8 through 11. In some examples, the base station may execute a set of codes to control the functional elements of the device to perform the functions described below. Additionally or alternatively, the base station may perform aspects the functions described below using special-purpose hardware.

At block 1905, a serving base station may monitor a throughput metric associated with a first connection between a UE and the serving base station as described above with reference to FIGS. 1 through 3D. In certain examples, the operations of block 1905 may be performed by a connection component as described with reference to FIGS. 8 through 11. At block 1910, the serving base station may identify an expected throughput metric associated with a second connection between the UE and a target base station as described above with reference to FIGS. 1 through 3D. In certain examples, the operations of block 1910 may be performed by a connection parameter component as described with reference to FIGS. 8 through 11.

At block 1915, the serving base station may identify, based on the throughput metric and the expected throughput metric, a handover loss metric associated with a handover procedure of the UE from the serving base station to the target base station as described above with reference to FIGS. 1 through 3D. In certain examples, the operations of block 1915 may be performed by a connection parameter component as described with reference to FIGS. 8 through 11. At block 1920, the serving base station may determine that the handover loss metric comprises a lossy handover metric as described above with reference to FIGS. 1 through 3D. In certain examples, the operations of block 1920 may be performed by a handover component as described with reference to FIGS. 8 through 11.

At block 1925, the serving base station may refrain from forwarding one or more buffered packets to the target base station, the buffered packets being addressed to the UE as described above with reference to FIGS. 1 through 3D. In certain examples, the operations of block 1925 may be performed by a buffered data component as described with reference to FIGS. 8 through 11. At block 1930, the serving base station may perform the handover procedure of the UE to the target base station according to the identified handover loss metric as described above with reference to FIGS. 1 through 3D. In certain examples, the operations of block 1930 may be performed by a handover component as described with reference to FIGS. 8 through 11.

Figure 20:
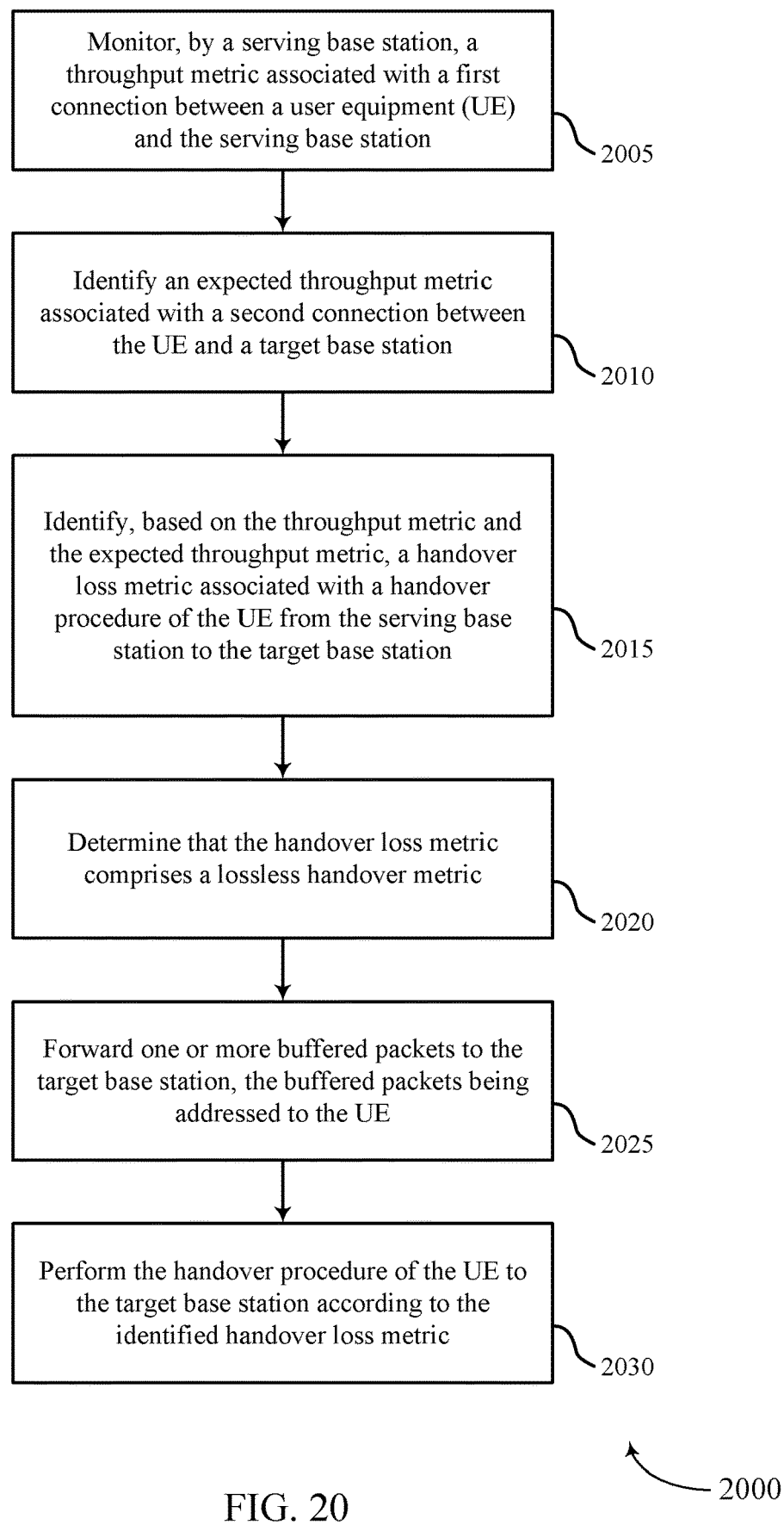

FIG. 20 shows a flowchart illustrating a method 2000 for transmission control protocol aware handover type determination in accordance with various aspects of the present disclosure. The operations of method 2000 may be implemented by a device such as a base station or its components as described with reference to FIGS. 1 through 3D. For example, the operations of method 2000 may be performed by the base station handover manager as described herein. In some examples, the base station may execute a set of codes to control the functional elements of the device to perform the functions described below. Additionally or alternatively, the base station may perform aspects the functions described below using special-purpose hardware.

At block 2005, a serving base station may monitor a throughput metric associated with a first connection between a UE and the serving base station as described above with reference to FIGS. 1 through 3D. In certain examples, the operations of block 2005 may be performed by a connection parameter component as described with reference to FIGS. 8 through 11. At block 2010, the serving base station may identify an expected throughput metric associated with a second connection between the UE and a target base station as described above with reference to FIGS. 1 through 3D. In certain examples, the operations of block 2010 may be performed by a connection parameter component as described with reference to FIGS. 8 through 11.

At block 2015, the serving base station may identify, based on the throughput metric and the expected throughput metric, a handover loss metric associated with a handover procedure of the UE from the serving base station to the target base station as described above with reference to FIGS. 1 through 3D. In certain examples, the operations of block 2015 may be performed by a connection parameter component as described with reference to FIGS. 8 through 11. At block 2020, the serving base station may determine that the handover loss metric comprises a lossless handover metric as described above with reference to FIGS. 1 through 3D. In certain examples, the operations of block 2020 may be performed by a buffered data component as described with reference to FIGS. 8 through 11.

At block 2025, the serving base station may forward one or more buffered packets to the target base station, the buffered packets being addressed to the UE as described above with reference to FIGS. 1 through 3D. In certain examples, the operations of block 2025 may be performed by a buffered data component as described with reference to FIGS. 8 through 11. At block 2030, the serving base station may perform the handover procedure of the UE to the target base station according to the identified handover loss metric as described above with reference to FIGS. 1 through 3D. In certain examples, the operations of block 2030 may be performed by a handover component as described with reference to FIGS. 8 through 11.

Figure 21:
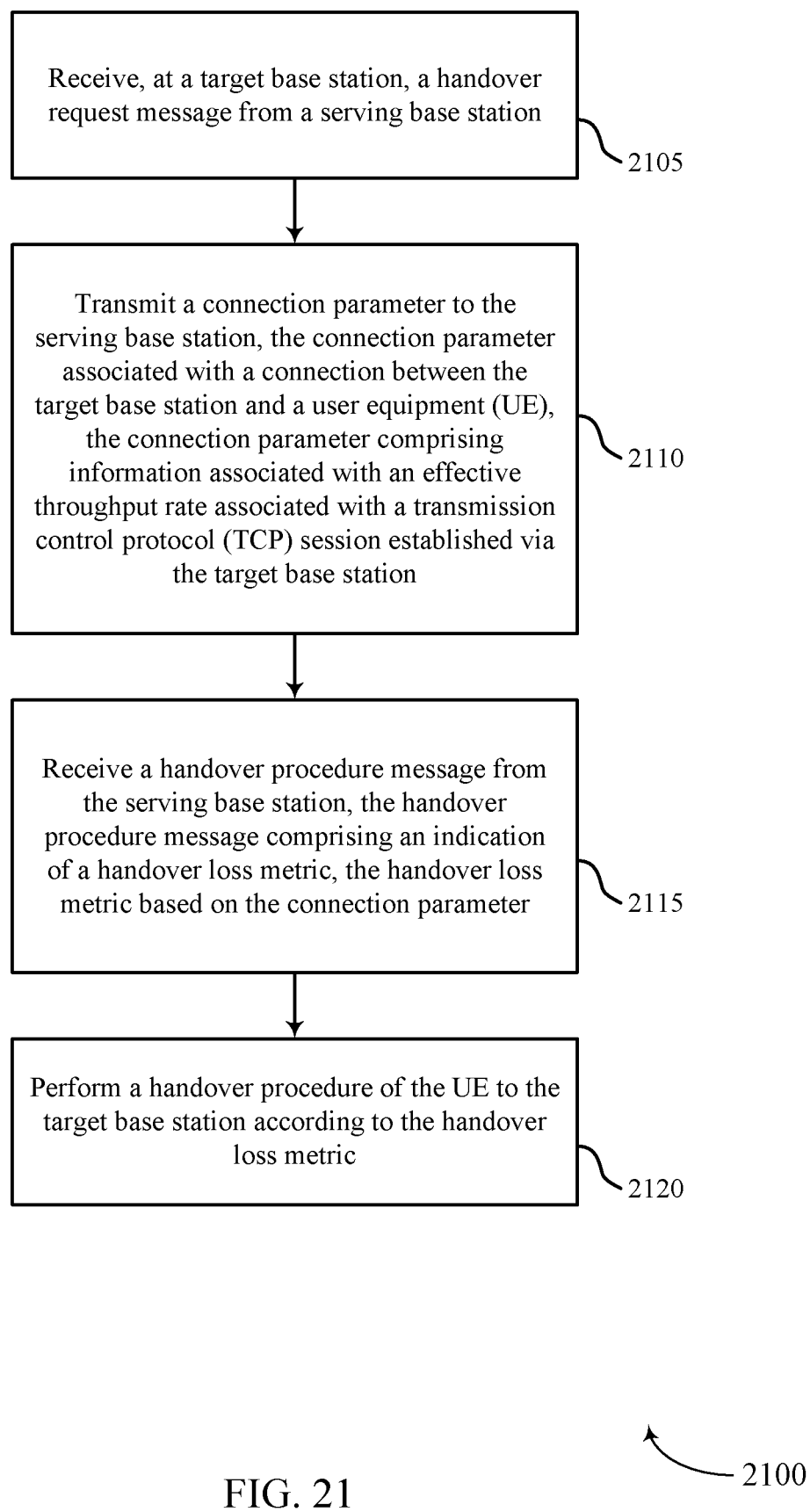

FIG. 21 shows a flowchart illustrating a method 2100 for transmission control protocol aware handover type determination in accordance with various aspects of the present disclosure. The operations of method 2100 may be implemented by a device such as a base station or its components as described with reference to FIGS. 1 through 3D. For example, the operations of method 2100 may be performed a base station handover manager as described with reference to FIGS. 8 through 11. In some examples, the base station may execute a set of codes to control the functional elements of the device to perform the functions described below. Additionally or alternatively, the base station may perform aspects the functions described below using special-purpose hardware.

At block 2105, a target base station may receive a handover request message from a serving base station as described above with reference to FIGS. 1 through 3D. In certain examples, the operations of block 2105 may be performed by a connection component as described with reference to FIGS. 8 through 11. At block 2110, the target base station may transmit a connection parameter to the serving base station. The connection parameter may be associated with a connection between the target base station and a UE. The connection parameter may include information associated with an effective throughput rate associated with a TCP session established via the target base station as described above with reference to FIGS. 1 through 3D. In certain examples, the operations of block 2110 may be performed by a connection parameter component as described with reference to FIGS. 8 through 11.

At block 2115, the target base station may receive a handover procedure message from the serving base station. The handover procedure message may include an indication of a handover loss metric. The handover loss metric may be based on the connection parameter as described above with reference to FIGS. 1 through 3D. In certain examples, the operations of block 2115 may be performed by a connection parameter component as described with reference to FIGS. 8 through 11. At block 2120, the target base station may perform a handover procedure of the UE to the target base station according to the handover loss metric as described above with reference to FIGS. 1 through 3D. In certain examples, the operations of block 2120 may be performed by a handover component as described with reference to FIGS. 8 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining a capability of the UE to maintain buffered data during a handover procedure;
   transmitting an indication of the capability of the UE to maintain buffered data during the handover procedure based at least in part on the determination;
   receiving a handover indication to maintain or discard buffered data during the handover procedure;
   selecting between maintaining the buffered data and discarding the buffered data based at least in part on the handover indication; and
   performing a handover procedure for the UE based at least in part on transmitting the indication of the capability of the UE and the received handover indication.

2. The method of claim 1, wherein the received handover indication indicates whether to maintain or discard buffered data for individual bearers.

3. The method of claim 1, wherein the transmitted indication comprises an indication of a capability of the UE to maintain buffered data for uplink or for downlink.

4. The method of claim 1, wherein the transmitted indication comprises a buffer size limit of the UE or a buffer size limit of a radio bearer associated with the UE.

5. The method of claim 1, further comprising:
   establishing a connection to a network via a base station serving the UE, wherein the indication is transmitted based at least in part on establishment of the connection.

6. The method of claim 1, further comprising:
   receiving a message from a base station serving the UE, wherein transmitting the indication is in response to receiving the message.

7. The method of claim 1, wherein performing the handover procedure further comprises:
   discarding data buffered at the UE prior to establishing a connection with a target base station.

8. The method of claim 1, wherein performing the handover procedure further comprises:
   transmitting buffered data to a target base station.

9. The method of claim 1, wherein the buffered data comprises data buffered in a packet data convergence protocol (PDCP) buffer.

10. The method of claim 1, wherein the buffered data comprises data sent over the air that has not yet been received or acknowledged by an intended recipient.

11. The method of claim 1, wherein the buffered data comprises all data ready to send over a connection.

12. A method for wireless communication at a user equipment (UE), comprising:
    receiving, from a serving base station, a handover indication whether to maintain buffered data during a handover procedure;
    selecting between maintaining or discarding data buffered at the UE based at least in part on the received handover indication; and
    performing the handover procedure for the UE according to the received indication.

13. The method of claim 12, wherein selecting between maintaining or discarding data buffered at the UE comprises:
    discarding data buffered at a packet data convergence protocol (PDCP) buffer when the indication comprises an indication to discard data buffered for uplink.

14. The method of claim 12, wherein selecting between maintaining or discarding data buffered at the UE comprises:
delivering one or more packets of the data buffered at the UE to an upper layer or to a next hop for uplink when the indication comprises an indication to discard data buffered for uplink.

15. The method of claim 12, wherein selecting between maintaining or discarding data buffered at the UE comprises:
forwarding one or more packets from a packet data convergence protocol (PDCP) buffer to an application layer of the UE.

16. The method of claim 12, wherein selecting between maintaining or discarding data buffered at the UE comprises:
transmitting one or more packets of the data buffered at the UE to a target base station.

17. A method for wireless communication, comprising:
determining, by a first base station, that a connection is established between a user equipment (UE) and a network;
receiving a connection parameter associated with a second base station associated with the network;
determining whether buffered data addressed to the UE is to be maintained or discarded during a handover procedure based at least in part on a connection parameter associated with the first base station, the connection parameter associated with the second base station, and a capability of the UE to select between maintaining or discarding buffered data for uplink and buffered data for downlink during the handover procedure; and
performing the handover procedure with the UE and the second base station according to the determination.

18. The method of claim 17, further comprising:
forwarding one or more packets of the buffered data to the second base station when the buffered data is determined to be maintained.

19. The method of claim 17, further comprising:
discarding one or more downlink packets of the buffered data when the buffered data is determined to be discarded; and
delivering one or more packets of buffered data received from the UE to an upper layer or to a next hop for when the buffered data is determined to be discarded.

20. The method of claim 17, wherein the connection parameter associated with the second base station is conveyed in a non-UE-specific message received over an X2 interface between the first base station and the second base station.

21. The method of claim 17, further comprising:
transmitting an indication of whether the buffered data is to be maintained or discarded to the second base station.

22. The method of claim 17, further comprising:
computing a throughput metric using the connection parameter associated with the first base station, or the connection parameter associated with the second base station, or a combination thereof, wherein determining whether to maintain or discard buffered data for uplink and buffered data for downlink is based at least in part on the throughput metric.

23. The method of claim 22, further comprising:
transmitting an indication of the throughput metric to the second base station.

24. The method of claim 17, further comprising:
monitoring the connection, wherein the connection parameter associated with the first base station is determined based at least in part on the monitoring.

25. The method of claim 17, further comprising:
receiving the connection parameter associated with the first base station from the UE.

26. The method of claim 17, further comprising:
selecting between maintaining or discarding buffered data based at least in part on a policy at the first base station, wherein the policy comprises the connection parameter associated with the first base station and the connection parameter associated with the second base station.

27. An apparatus for wireless communication, in a system comprising:
a processor;
memory in electronic communication with the processor; and
the processor and memory configured to:
determine a capability of the UE to maintain buffered data during a handover procedure;
transmit an indication of the capability of the UE to maintain buffered data during the handover procedure based at least in part on the determination;
receive a handover indication to maintain or discard buffered data during the handover procedure;
select between maintaining the buffered data and discarding the buffered data based at least in part on the handover indication; and
perform a handover procedure for the UE based at least in part on transmitting the indication of the capability of the UE and received handover indication.

* * * * *